United States Patent
Echigo et al.

(10) Patent No.: US 11,670,779 B2
(45) Date of Patent: Jun. 6, 2023

(54) METAL SUPPORT FOR ELECTROCHEMICAL ELEMENT, ELECTROCHEMICAL ELEMENT, ELECTROCHEMICAL MODULE, ELECTROCHEMICAL DEVICE, ENERGY SYSTEM, SOLID OXIDE FUEL CELL, SOLID OXIDE ELECTROLYTIC CELL, AND METHOD FOR MANUFACTURING METAL SUPPORT

(71) Applicant: Osaka Gas Co., Ltd., Osaka (JP)

(72) Inventors: Mitsuaki Echigo, Osaka (JP); Hisao Ohnishi, Osaka (JP); Kazuyuki Minami, Osaka (JP); Yuji Tsuda, Osaka (JP); Kyohei Manabe, Osaka (JP); Osamu Yamazaki, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 146 days.

(21) Appl. No.: 17/044,094

(22) PCT Filed: Mar. 29, 2019

(86) PCT No.: PCT/JP2019/014378
§ 371 (c)(1),
(2) Date: Dec. 30, 2020

(87) PCT Pub. No.: WO2019/189913
PCT Pub. Date: Oct. 3, 2019

(65) Prior Publication Data
US 2021/0119228 A1    Apr. 22, 2021

(30) Foreign Application Priority Data

Mar. 30, 2018 (JP) .............. JP2018-070342

(51) Int. Cl.
*H01M 8/0232* (2016.01)
*H01M 8/2432* (2016.01)
(Continued)

(52) U.S. Cl.
CPC ....... *H01M 8/0232* (2013.01); *H01M 8/0245* (2013.01); *H01M 8/04014* (2013.01);
(Continued)

(58) Field of Classification Search
CPC ............ H01M 8/0232; H01M 8/2432; H01M 8/0245; H01M 8/04014; H01M 8/0494; H01M 8/0612; H01M 8/1226
(Continued)

(56) References Cited

U.S. PATENT DOCUMENTS

2002/0048699 A1   4/2002  Steele et al.
2005/0048352 A1   3/2005  Horiuchi et al.
(Continued)

FOREIGN PATENT DOCUMENTS

CA    2961714 A1 *  3/2016  ............. H01M 4/86
JP    2004273213 A   9/2004
(Continued)

*Primary Examiner* — James M Erwin
(74) *Attorney, Agent, or Firm* — The Webb Law Firm

(57) ABSTRACT

A metal support for an electrochemical element has a plate shape as a whole, and is provided with a plurality of penetration spaces that pass through the metal support from a front face to a back face. The front face is a face to be provided with an electrode layer. Each of front-side openings that are openings of the penetration spaces formed in the front face has an area of $3.0 \times 10^{-4}$ mm$^2$ or more and $3.0 \times 10^{-3}$ mm$^2$ or less.

18 Claims, 6 Drawing Sheets

(51) Int. Cl.
*H01M 8/0245* (2016.01)
*H01M 8/04014* (2016.01)
*H01M 8/04858* (2016.01)
*H01M 8/0612* (2016.01)
*H01M 8/1226* (2016.01)
*H01M 8/12* (2016.01)

(52) U.S. Cl.
CPC ....... *H01M 8/0494* (2013.01); *H01M 8/0612* (2013.01); *H01M 8/1226* (2013.01); *H01M 8/2432* (2016.02); *H01M 2008/1293* (2013.01)

(58) Field of Classification Search
USPC ........................................................ 429/479
See application file for complete search history.

(56) References Cited

U.S. PATENT DOCUMENTS

| | | |
|---|---|---|
| 2008/0107948 A1 | 5/2008 | Yamanis |
| 2010/0104912 A1 | 4/2010 | Ogawa et al. |
| 2012/0122000 A1 | 5/2012 | Lee et al. |
| 2012/0247746 A1 | 10/2012 | Sakajo et al. |
| 2014/0030630 A1* | 1/2014 | Dawson ................ H01M 4/921 429/535 |
| 2015/0064597 A1 | 3/2015 | Leah et al. |
| 2016/0149239 A1* | 5/2016 | Rule ................ H01M 8/04089 429/429 |
| 2017/0005357 A1* | 1/2017 | Mermelstein ....... H01M 8/0494 |
| 2017/0098841 A1* | 4/2017 | Higashino ........... H01M 4/9058 |
| 2017/0309941 A1 | 10/2017 | Echigo et al. |
| 2018/0094356 A1* | 4/2018 | Ukai ........................ C25B 9/73 |
| 2019/0088969 A1 | 3/2019 | Koizumi et al. |
| 2019/0341640 A1 | 11/2019 | Echigo et al. |
| 2020/0082998 A1 | 3/2020 | Sawada et al. |

FOREIGN PATENT DOCUMENTS

| | | |
|---|---|---|
| JP | 2005150053 A | 6/2005 |
| JP | 2008525967 A | 7/2008 |
| JP | 201333618 A | 2/2013 |
| JP | 2013157234 A | 8/2013 |
| JP | 201449320 A | 3/2014 |
| JP | 2014123481 A | 7/2014 |
| JP | 201733799 A | 2/2017 |
| JP | 2017159290 A | 9/2017 |
| TW | 201806223 A | 2/2018 |

\* cited by examiner

METAL SUPPORT FOR ELECTROCHEMICAL ELEMENT, ELECTROCHEMICAL ELEMENT, ELECTROCHEMICAL MODULE, ELECTROCHEMICAL DEVICE, ENERGY SYSTEM, SOLID OXIDE FUEL CELL, SOLID OXIDE ELECTROLYTIC CELL, AND METHOD FOR MANUFACTURING METAL SUPPORT

CROSS-REFERENCE TO RELATED APPLICATIONS

This application is the United States national phase of International Application No. PCT/JP2019/014378 filed Mar. 29, 2019, and claims priority to Japanese Patent Application No. 2018-070342 filed Mar. 30, 2018, the disclosures of which are hereby incorporated by reference in their entirety.

BACKGROUND OF THE INVENTION

Field of the Invention

The present invention relates to a metal-supported electrochemical element, a metal support for a metal-supported electrochemical element, and the like.

Description of Related Art

A metal support for a conventional metal-supported SOFC is formed by providing many holes in a metal plate. However, an optimum hole shape that is determined in view of workability and cost of mass production and ensures sufficient SOFC performance has not been found yet.
Patent Document 1: JP 2008-525967A.

SUMMARY OF THE INVENTION

Patent Document 1 discloses a structure of a metal support configured in view of workability during the formation of a cell. The cell disclosed in Patent Document 1 is formed by providing an electrode layer, an electrolyte layer, and a counter electrode layer one on top of another on a metal foil that has a thickness of approximately 15 μm and is provided with many holes. Due to low strength, such a thin metal foil is difficult to handle during the cell production and is not suitable for mass production.

The present invention was made in view of the aforementioned problem, and an object thereof is to provide an electrochemical element and the like with which sufficient strength and performance are ensured, and the workability and cost of mass production are improved.

Configuration 1:

In order to achieve the above-mentioned object, in a characteristic configuration of a metal support for an electrochemical element, the metal support has a plate shape as a whole, the metal support is provided with a plurality of penetration spaces that pass through the metal support from a front face to a back face, the front face is a face to be provided with an electrode layer, and each of front-side openings that are openings of the penetration spaces formed in the front face has an area of $3.0 \times 10^{-4}$ $mm^2$ or more and $3.0 \times 10^{-3}$ $mm^2$ or less.

With the above-mentioned characteristic configuration, the area of each of the front-side openings is $3.0 \times 10^{-4}$ $mm^2$ or more, and therefore, using this metal support is favorable because a sufficient amount of fuel gas (or air) can be supplied to the electrode layer of the electrochemical element, and thus sufficient performance of the electrochemical element can be ensured. It should be noted that the area of each of the front-side openings is more preferably $4.0 \times 10^{-4}$ $mm^2$ or more, and even more preferably $7.0 \times 10^{-4}$ $mm^2$ or more. The reason for this is that, since a larger amount of fuel gas (or air) can be supplied to the electrode layer of the electrochemical element as the opening area becomes larger, and employing such a configuration makes it possible to further improve the performance of the electrochemical element. Also, the area of each of the front-side openings is $3.0 \times 10^{-3}$ $mm^2$ or less, and therefore, using this metal support is favorable because a highly reliable electrochemical element can be obtained due to the strength of the metal support being sufficiently maintained, the processing cost of the penetration spaces can be reduced, and the constitutional elements such as an electrode layer can be easily formed on the metal support provided with a plurality of penetration spaces. It should be noted that the area of each of the front-side openings is more preferably $2.0 \times 10^{-3}$ $mm^2$ or less, and even more preferably $1.5 \times 10^{-3}$ $mm^2$ or less. The reason for this is that employing such a configuration makes it possible to further increase the above-described effects.

Configuration 2:

In another characteristic configuration of the metal support according to the present invention, each of the front-side openings has a circular shape or a substantially circular shape having a diameter of 20 μm or more and 60 μm or less.

The above-mentioned characteristic configuration is favorable because the processing for forming the penetration spaces is facilitated, and the workability and cost of mass production can be improved. The front-side openings preferably have a circular shape or a substantially circular shape having a diameter of 20 μm or more, more preferably have a circular shape or a substantially circular shape having a diameter of 25 μm or more, and even more preferably have a circular shape or a substantially circular shape having a diameter of 30 μm or more. The reason for this is that employing such a configuration makes it possible to supply a sufficient amount of fuel gas (or air) to an electrode layer of the electrochemical element, and thus the performance of the electrochemical element can be further improved. Also, the front-side openings preferably have a circular shape or a substantially circular shape having a diameter of 60 μm or less, more preferably have a circular shape or a substantially circular shape having a diameter of 50 μm or less, and even more preferably have a circular shape or a substantially circular shape having a diameter of 40 μm or less. The reason for this is that employing such a configuration makes it easier to form the constitutional elements of the electrochemical element such as an electrode layer on the metal support provided with a plurality of penetration spaces while improving the strength of the metal support.

Configuration 3:

In the metal support according to the present invention, each of back-side openings that are openings of the penetration spaces formed in the back face may have an area or a diameter larger than those of the front-side openings.

The above-mentioned characteristic configuration is favorable because the processing for forming the penetration spaces is further facilitated, and the workability and cost of mass production can be improved. Moreover, this configuration is favorable because the ratio of the thickness of the entire metal support to the area of the front-side openings of the metal support can be increased, thus making it easy to form the constitutional elements of the electrochemical element such as an electrode layer on the metal support while ensuring sufficient strength.

Configuration 4:

In the metal support according to the present invention, it is preferable that intervals between the front-side openings are 0.05 mm or more and 0.3 mm or less.

The above-mentioned characteristic configuration is favorable because both the strength and the performance of the metal support can be increased. The intervals between the front-side openings are preferably 0.05 mm or more, more preferably 0.1 mm or more, and even more preferably 0.15 mm or more. The reason for this is that employing such a configuration makes it possible to further increase the strength of the metal support as well as makes it easier to form the constitutional elements of the electrochemical element such as an electrode layer on the metal support provided with a plurality of penetration spaces. Also, the intervals between the front-side openings are preferably 0.3 mm or less, more preferably 0.25 mm or less, and even more preferably 0.2 mm or less. The reason for this is that employing such a configuration makes it possible to supply a sufficient amount of fuel gas (or air) to the electrode layer of the electrochemical element, and thus the performance of the electrochemical element can be further improved.

Configuration 5:

It is preferable that the metal support according to the present invention has a thickness of 0.1 mm or more and 1.0 mm or less.

The above-mentioned characteristic configuration is favorable because the strength of the entire metal support can be sufficiently maintained while penetration spaces are formed to have an appropriate size, thus making it possible to improve workability in mass production and reduce the material cost. The thickness of the metal support is preferably 0.1 mm or more, more preferably 0.15 mm or more, and even more preferably 0.2 mm or more. The reason for this is that employing such a configuration makes it possible to further facilitate handling in mass production while maintaining the strength of the metal support. The thickness of the metal support is preferably 1.0 mm or less, more preferably 0.75 mm or less, and even more preferably 0.5 mm or less. The reason for this is that employing such a configuration makes it possible to further reduce the material cost of the metal support while maintaining the strength of the metal support.

Configuration 6:

In another characteristic configuration of the metal support according to the present invention, the metal support is formed by stacking a plurality of metal plates.

The above-mentioned characteristic configuration is favorable because the thickness of the entire metal support can be secured to sufficiently maintain the strength while penetration spaces are formed to have an appropriate size, thus making it possible to improve workability in mass production.

Configuration 7:

In another characteristic configuration of the metal support according to the present invention, the metal support is formed by stacking a plurality of metal plates having the same thickness or substantially the same thickness.

The above-mentioned characteristic configuration is favorable because the thickness of the entire metal support can be secured to sufficiently maintain the strength thereof while penetration spaces are formed to have an appropriate size, thus making it possible to improve workability in mass production. In this case, the thickness of the entire metal support can be secured by stacking metal plates having the same or substantially the same thickness that are provided with the same or substantially the same penetration spaces and joining these metal plates, thus making it possible to improve the cost. Therefore, the characteristic configuration is favorable.

Configuration 8:

In another characteristic configuration of the metal support according to the present invention, the metal support is formed by stacking a plurality of metal plates including a first metal plate that is a plate made of metal, and a second metal plate that is a plate made of metal and is thicker than the first metal plate, the first metal plate being arranged closer to the front face than the second metal plate is.

The above-mentioned characteristic configuration is favorable because the thickness of the entire metal support can be secured to sufficiently maintain the strength while penetration spaces are formed to have an appropriate size, thus making it possible to improve workability in mass production. In this case, the thickness of the entire metal support can be secured by stacking the relatively thin first metal plate provided with openings and the relatively thick second metal plate provided with openings, the openings provided in the first metal plates being smaller in size than the openings provided in the second metal plates, and joining these metal plates, thus making it possible to increase the ratio of the thickness of the entire metal support to the area of the front-side openings of the metal support. This makes it easy to form the constitutional elements of the electrochemical element such as an electrode layer on the metal support while ensuring sufficient strength, and thus the characteristic configuration is favorable.

Configuration 9:

In another characteristic configuration of the metal support according to the present invention, the metal support is made of a Fe—Cr based alloy.

With the above-mentioned characteristic configuration, the oxidation resistance and high-temperature strength of the metal support can be improved. Moreover, this characteristic configuration is favorable because the thermal expansion coefficient of the metal support can be set to be close to those of the materials of the constitutional elements of the electrochemical element such as an electrode layer and an electrolyte layer, which are formed on the metal support, thus making it possible to realize an electrochemical element having excellent heat-cycle durability.

Configuration 10:

In another characteristic configuration of the metal support according to the present invention, at least a portion of the front face is covered by a metal oxide film.

With the above-mentioned characteristic configuration, the metal oxide coating can suppress diffusion of the components such as Cr of the metal support to the electrode layer and the like, thus making it possible to suppress a decrease in performance of the electrode layer and the like, and making it possible to improve the performance and durability of the electrochemical element.

Configuration 11

The electrochemical element in which at least an electrode layer, an electrolyte layer, and a counter electrode layer are provided on/over the front face of the above-described metal support is favorable because sufficient performance is ensured, and the workability and cost of mass production are improved. Furthermore, this electrochemical element is favorable because the constitutional elements of the electrochemical element such as an electrode layer and an electrolyte layer are formed on/over the metal support having excellent strength, and therefore, the constitutional elements of the electrochemical element such as an electrode layer and an electrolyte layer can be formed as thin layers or thin films, thus making it possible to reduce the material cost of the electrochemical element.

Configuration 12:

In a characteristic configuration of an electrochemical module, a plurality of the above-described electrochemical elements are arranged in an assembled state.

With the above-mentioned characteristic configuration, the plurality of the above-described electrochemical elements are arranged in an assembled state, thus making it possible to obtain an electrochemical module that is compact, has high performance, and has excellent strength and reliability, while also suppressing the material cost and processing cost.

Configuration 13:

A characteristic configuration of an electrochemical device according to the present invention includes at least the above-described electrochemical element or the above-described electrochemical module and a fuel converter, and includes a fuel supply unit that allows gas containing a reducing component to flow between the electrochemical element or the electrochemical module and the fuel converter.

With the above-mentioned characteristic configuration, the electrochemical device includes the electrochemical element or electrochemical module and the fuel converter and includes the fuel supply unit that allows the fuel gas containing a reducing component to flow between the electrochemical element or electrochemical module and the fuel converter. Therefore, in the case of operating the electrochemical element or electrochemical module as a fuel cell, employing a configuration in which hydrogen is generated using a fuel converter such as a reformer from natural gas or the like supplied using an existing raw fuel supply infrastructure such as city gas makes it possible to realize an electrochemical device including an electrochemical element or electrochemical module that has excellent durability, reliability, and performance. Also, it is easier to construct a system that recycles unused fuel gas discharged from the electrochemical module, thus making it possible to realize a highly efficient electrochemical device.

In the case of operating the electrochemical element or electrochemical module as an electrolytic (electrolysis) cell, gas containing water vapor and carbon dioxide flows to an electrode layer, and a voltage is applied between the electrode layer and a counter electrode layer. As a result, in the electrode layer, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer through the electrolyte layer. In the counter electrode layer, the oxygen ions $O^{2-}$ release electrons and oxygen molecules $O_2$ are produced. Through the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide molecules CO and oxygen $O_2$.

In the case where gas containing water vapor and carbon dioxide molecules $CO_2$ flows, a fuel converter that synthesizes various compounds such as hydrocarbons from hydrogen, carbon monoxide, and the like generated through the above-mentioned electrolysis in the electrochemical element or electrochemical module can be provided. With the fuel supply unit, hydrocarbon and the like produced by this fuel converter can flow to the electrochemical element or electrochemical module or can be extracted from the system and the device and separately used as fuel or a chemical raw material.

Configuration 14:

A characteristic configuration of an electrochemical device according to the present invention includes at least the above-described electrochemical element or the above-described electrochemical module and a power converter that extracts power from the electrochemical element or the electrochemical module or supplies power to the electrochemical element or the electrochemical module.

With the above-mentioned characteristic configuration, the power converter extracts power generated by the electrochemical element or electrochemical module or supplies power to the electrochemical element or electrochemical module. Thus, as mentioned above, the electrochemical element or electrochemical module serves as a fuel cell or an electrolytic cell. Accordingly, with the above-mentioned configuration, it is possible to provide an electrochemical element and the like that can improve the efficiency of converting chemical energy such as fuel into electric energy or can improve the efficiency of converting electric energy into chemical energy such as fuel.

It should be noted that it is preferable to use an inverter as the power converter, for example, because the inverter can be used to boost electrical output obtained from the electrochemical element or electrochemical module that has excellent durability, reliability, and performance, and to convert a direct current into an alternating current, thus making it easy to use the electrical output obtained from the electrochemical element or electrochemical module.

Configuration 15:

A characteristic configuration of an energy system according to the present invention includes the above-described electrochemical device, and a waste heat utilization system that reuses heat discharged from the electrochemical device.

The above-mentioned characteristic configuration includes the electrochemical device and the waste heat utilization system that reuses heat discharged from the electrochemical device, thus making it possible to realize an energy system that has excellent durability, reliability, and performance as well as excellent energy efficiency. It should be noted that it is also possible to realize a hybrid system that has excellent energy efficiency by combination with a power generation system that generates power with use of combustion heat from unused fuel gas discharged from the electrochemical device.

Configuration 16:

A characteristic configuration of a solid oxide fuel cell according to the present invention includes the above-described electrochemical element, and causes a power generation reaction.

With the above-mentioned characteristic configuration, the solid oxide fuel cell including the electrochemical element that has excellent durability, reliability, and performance can cause a power generation reaction, and thus a solid oxide fuel cell having high durability and high performance can be obtained. It should be noted that a solid oxide fuel cell that can be operated in a temperature range of 650° C. or higher during the rated operation is more preferable because a fuel cell system that uses hydrocarbon-based gas such as city gas as raw fuel can be constructed such that waste heat discharged from a fuel cell can be used in place of heat required to convert raw fuel to hydrogen, and the power generation efficiency of the fuel cell system can thus be improved. A solid oxide fuel cell that is operated in a temperature range of 900° C. or lower during the rated operation is more preferable because the effect of suppressing volatilization of Cr from a metal-supported electrochemical element can be improved, and a solid oxide fuel cell that is operated in a temperature range of 850° C. or lower during the rated operation is even more preferable because the effect of suppressing volatilization of Cr can be further improved.

Configuration 17:

A characteristic configuration of a solid oxide electrolytic cell according to the present invention includes the above-described electrochemical element, wherein an electrolytic reaction is caused in the electrochemical element.

With the above-mentioned characteristic configuration, the solid oxide electrolytic cell including the electrochemical element that has excellent durability, reliability, and performance can produce gas through an electrolytic reaction, and thus a solid oxide electrolytic cell having high durability and high performance can be obtained.

Configuration 18:

In order to achieve the above-mentioned object, a characteristic configuration of a manufacturing method for manufacturing the above-described metal support includes forming the plurality of penetration spaces passing through a metal material plate from the front face to the back face through laser processing, punching processing, etching processing, or a combination thereof.

With the above-mentioned characteristic configuration, the processing for forming the penetration spaces is facilitated, and the workability and cost of mass production can be improved.

DETAILED DESCRIPTION OF THE INVENTION

First Embodiment

Hereinafter, an electrochemical element E and a solid oxide fuel cell (SOFC) according to this embodiment will be described with reference to FIG. 1. The electrochemical element E is used as a constitutional element of a solid oxide fuel cell that receives a supply of air and fuel gas containing hydrogen and generates power, for example. It should be noted that when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, in a metal support 1, a face on which the electrode layer 2 is formed is referred to as "front face 1a", and a face on an opposite side is referred to as "back face 1b".

Figure 1:
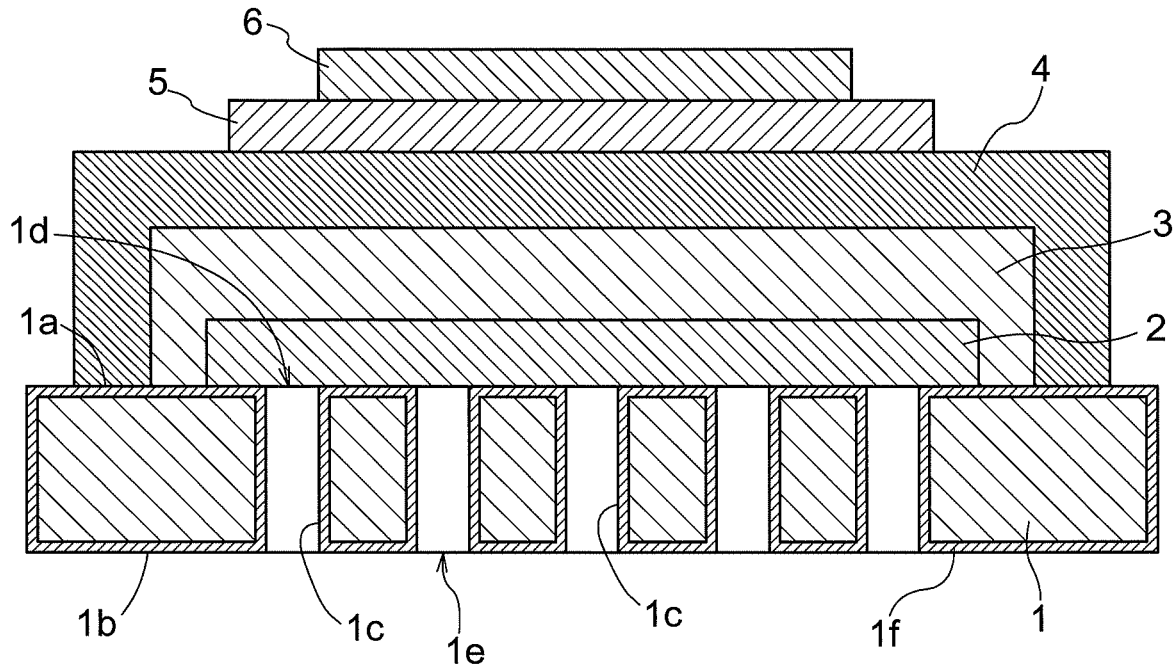
FIG. 1 is a schematic diagram showing a configuration of an electrochemical element.

Electrochemical Element:

As shown in FIG. 1, the electrochemical element E includes a metal support 1, an electrode layer 2 formed on the metal support 1, an intermediate layer 3 formed on the electrode layer 2, and an electrolyte layer 4 formed on the intermediate layer 3. The electrochemical element E further includes a reaction preventing layer 5 formed on the electrolyte layer 4, and a counter electrode layer 6 formed on the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

Metal Support:

The metal support 1 supports the electrode layer 2, the intermediate layer 3, the electrolyte layer 4, and the like, and maintains the strength of the electrochemical element E. That is, the metal support 1 serves as a support that supports the electrochemical element E.

A material that has excellent electron conductivity, thermal resistance, oxidation resistance, and corrosion resistance is used as the material of the metal support 1. Examples thereof include ferrite-based stainless steel, austenite-based stainless steel, and a nickel-based alloy. In particular, an alloy containing chromium is favorably used. In this embodiment, the metal support 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The metal support 1 has a plate shape as a whole. The metal support 1 is provided with a plurality of penetration spaces 1c that pass through the metal support 1 from the front face 1a, which is a face on which the electrode layer 2 is provided, to the back face 1b. The penetration space 1c allows gas to permeate from the back face 1b of the metal support 1 to the front face 1a thereof. It should be noted that a configuration is also possible in which the plate-like metal support 1 is deformed into, for example, a box shape, a cylindrical shape, or the like through bending or the like and used.

A metal oxide layer 1f serving as a diffusion suppressing layer is provided on the surface of the metal support 1. That is, the diffusion suppressing layer is formed between the metal support 1 and the electrode layer 2, which will be described later. The metal oxide layer 1f is provided not only on the face of the metal support 1 exposed to the outside but also on the face (interface) that is in contact with the electrode layer 2. The metal oxide layer 1f can also be provided on the inner faces of the penetration spaces 1c. Element interdiffusion that occurs between the metal support 1 and the electrode layer 2 can be suppressed due to this metal oxide layer 1f. For example, when ferrite-based stainless steel containing chromium is used in the metal support 1, the metal oxide layer 1f is mainly made of a chromium oxide. The metal oxide layer 1f containing the chromium oxide as the main component suppresses diffusion of chromium atoms and the like of the metal support 1 to the electrode layer 2 and the electrolyte layer 4. The metal oxide layer 1f need only have such a thickness that allows both high diffusion preventing performance and low electric resistance to be achieved.

The metal oxide layer 1f can be formed using various techniques, but it is favorable to use a technique of oxidizing the surface of the metal support 1 to obtain a metal oxide. Also, the metal oxide layer 1f may be formed on the surface of the metal support 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer 1f may also contain a spinel phase that has high electrical conductivity, or the like.

When a ferrite-based stainless steel material is used to form the metal support 1, its thermal expansion coefficient is close to that of YSZ (yttria-stabilized zirconia), GDC (gadolinium-doped ceria; also called CGO), or the like, which is used as the material of the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Structures of Metal Support and Penetration Spaces:

In the example shown in FIG. 1, the metal support 1 is constituted by a single metal plate. The metal support 1 can also be formed by stacking a plurality of metal plates. The metal support 1 can also be formed by stacking a plurality of metal plates that have the same thickness or substantially the same thickness. The metal support 1 can also be formed by stacking a plurality of metal plates that have different thicknesses. Hereinafter, examples of the structures of the metal support 1 and the penetration spaces 1c will be described with reference to the drawings. It should be noted that the metal oxide layer 1f is not shown.

First Example

Figure 5:
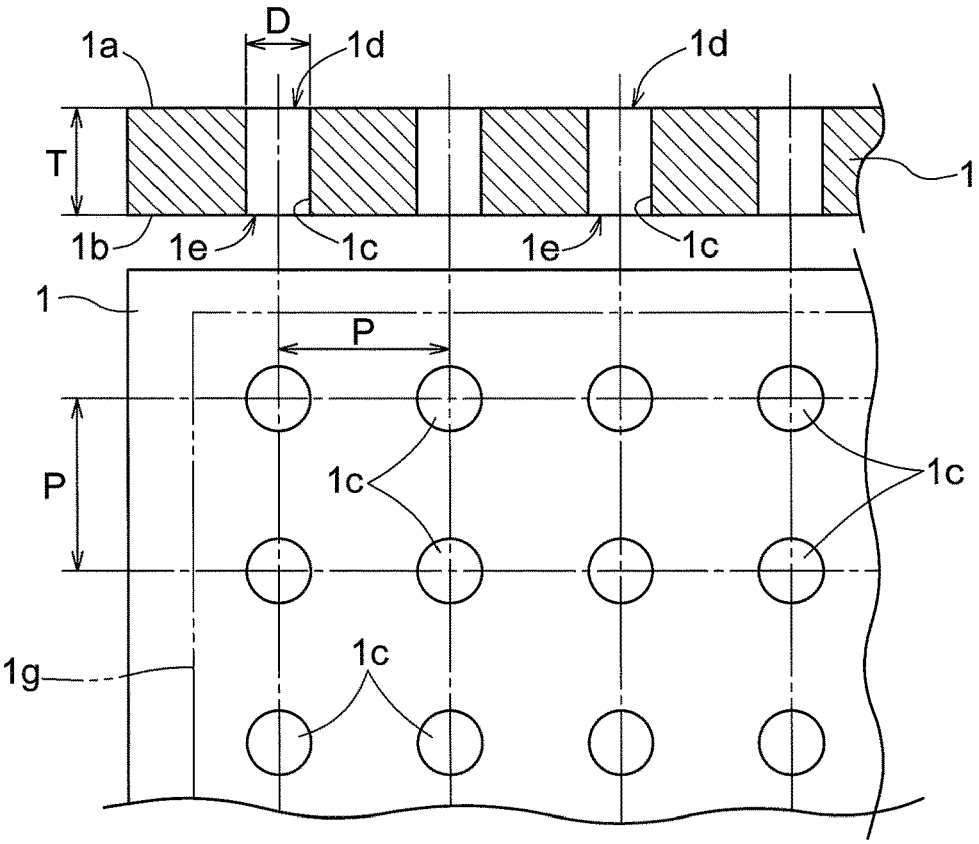
FIG. 5 shows a plan view and a cross-sectional view showing a structure of a metal support.

An example (first example) in which the metal support 1 is constituted by a single metal plate will be described with reference to FIG. 5. As shown in FIG. 5, the metal support 1 is a plate-like member having a thickness T. That is, the metal support 1 has a plate shape as a whole. The metal support 1 is provided with the plurality of penetration spaces 1c that pass through the metal support 1 from the front face 1a to the back face 1b. In the first example, the penetration spaces 1c are holes with a circular cross section. The cross section of each of the penetration spaces 1c may also have a rectangular shape, a triangular shape, a polygonal shape, or the like other than a circular shape or a substantially circular shape. Various shapes can be selected as long as the penetration spaces 1c can be formed and the functions of the metal support 1 can be maintained. These holes (penetration spaces 1c) are formed in the metal support 1 through laser processing, punching processing, etching processing, or a combination thereof. The central axes of these holes are orthogonal to the metal support 1. It should be noted that the central axes of the holes (penetration spaces 1c) may be inclined to the metal support 1.

The openings of the penetration spaces 1c formed in the front face 1a are referred to as "front-side openings 1d". The openings of the penetration spaces 1c formed in the back face 1b are referred to as "back-side openings 1e". Since the cross sections of the penetration spaces 1c are circular holes, all of the front-side openings 1d and the back-side openings 1e have a circular shape. The front-side openings 1d and the back-side openings 1e may have the same size. The back-side openings 1e may be larger than the front-side openings 1d. The diameter of each of the front-side openings 1d is taken as a "diameter D".

As shown in FIG. 5, in the metal support 1, the plurality of holes (penetration spaces 1c) are formed at positions corresponding to the lattice points of an orthogonal lattice at a pitch P (interval). The arrangement pattern of the plurality of holes (penetration spaces 1c) may be an orthorhombic lattice or an equilateral-triangular lattice other than the orthogonal lattice. The plurality of holes can be arranged at intersection points of the diagonal lines in addition to the lattice points. Various arrangement patterns can be selected as long as the penetration spaces can be formed and the functions of the metal support can be maintained.

A region of the front face 1a of the metal support 1 provided with the penetration spaces 1c is referred to as the "hole region 1g". The hole region 1g is provided in a region of the metal support 1 excluding the vicinity of the outer peripheral region. The metal support 1 may be provided with a single hole region 1g or a plurality of hole regions 1g.

The metal support 1 is required to have a strength that is sufficient to serve as a support for forming the electrochemical element E. The thickness T of the metal support 1 is preferably 0.1 mm or more, more preferably 0.15 mm or more, and even more preferably 0.2 mm or more. The thickness T of the metal support 1 is preferably 1.0 mm or less, more preferably 0.75 mm or less, and even more preferably 0.5 mm or less.

The diameter D of each of the front-side openings 1d is preferably 20 μm or more, more preferably 25 μm or more, and even more preferably 30 μm or more. The diameter D of each of the front-side openings 1d is preferably 60 μm or less, more preferably 50 μm or less, and even more preferably 40 μm or less.

The arrangement pitch P of the penetration spaces 1c (holes) is preferably 0.05 mm or more, more preferably 0.1 mm or more, and even more preferably 0.15 mm or more. The arrangement pitch P of the penetration spaces 1c (holes) is preferably 0.3 mm or less, more preferably 0.25 mm or less, and even more preferably 0.2 mm or less.

An area S of each of the front-side openings 1d of the penetration spaces 1c is preferably $3.0 \times 10^{-4}$ mm$^2$ or more, more preferably $4.0 \times 10^{-4}$ mm$^2$ or more, and even more preferably $7.0 \times 10^{-4}$ mm$^2$ or more. Also, the area S of each of the front-side openings 1d of the penetration spaces 1c is preferably $3.0 \times 10^{-3}$ mm$^2$ or less, more preferably $2.0 \times 10^{-3}$ mm$^2$ or less, and even more preferably $1.5 \times 10^{-3}$ mm$^2$ or less.

Second Example

Figure 6:
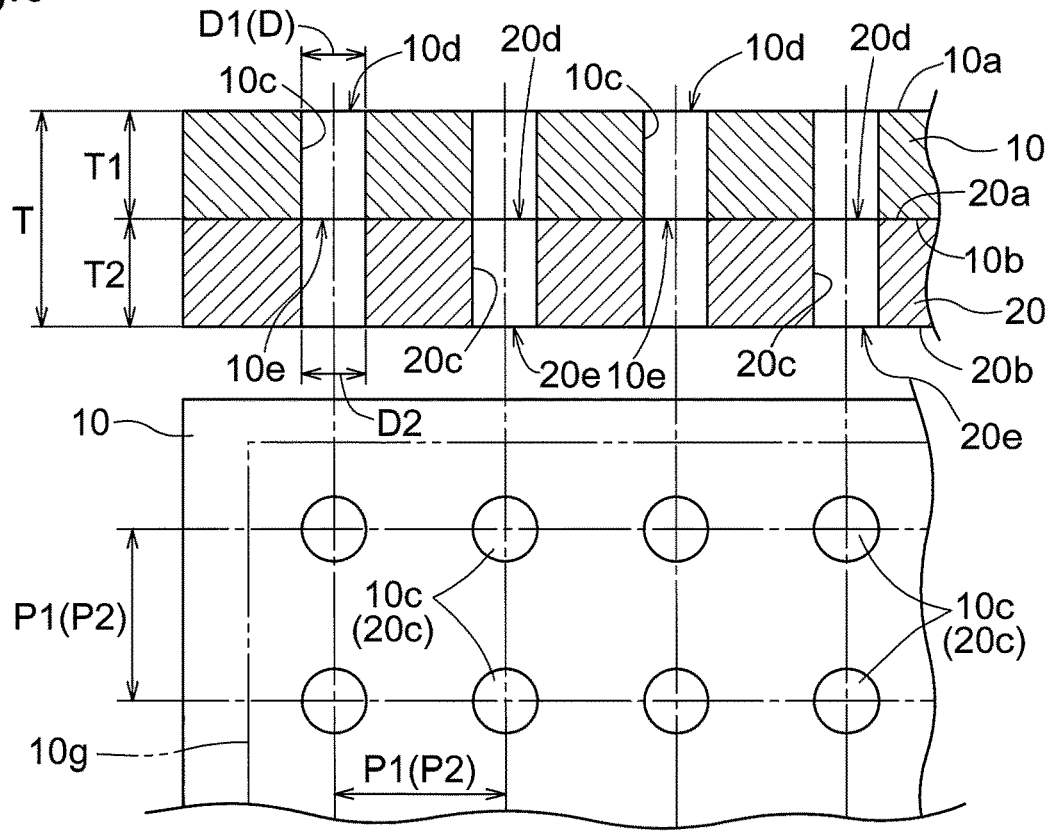
FIG. 6 shows a plan view and a cross-sectional view showing the structure of the metal support.

An example (second example) in which the metal support 1 is formed by stacking a plurality of metal plates having the same thickness will be described with reference to FIG. 6. As shown in FIG. 6, in the second example, the metal support 1 is constituted by a first metal plate 10 having a thickness T1 and a second metal plate 20 having a thickness T2. The first metal plate 10 and the second metal plate 20 have the same thickness. The metal support 1 is formed by stacking the first metal plate 10 and the second metal plate 20. The metal support 1 is a plate-like member having an overall thickness T. The first metal plate 10 and the second metal plate 20 are joined to each other using a technique such as a spot-welding technique, a brazing technique, or a vacuum joining technique. It should be noted that the first metal plate 10 and the second metal plate 20 may have slightly different thicknesses, namely substantially the same thickness.

The first metal plate 10 is provided with a plurality of first penetration spaces 10c that pass through the first metal plate 10 from a first front face 10a, which is a face on the front side, to a first back face 10b, which is a face on the back side. The first penetration spaces 10c are holes with circular cross sections. The cross section of each of the first penetration spaces 10c may also have a rectangular shape, a triangular shape, or the like other than a circular shape or a substantially circular shape. These holes (first penetration spaces 10c) are formed in the first metal plate 10 through laser processing, punching processing, etching processing, or a combination thereof. The central axes of these holes are orthogonal to the first metal plate 10. It should be noted that the central axes of the holes (first penetration spaces 10c) may be inclined to the first metal plate 10.

The openings of the first penetration spaces 10c formed in the first front face 10a are referred to as "first front-side openings 10d". The openings of the first penetration spaces 10c formed in the first back face 10b are referred to as "first back-side openings 10e". Since the first penetration spaces 10c are holes with circular cross sections, all of the first front-side openings 10d and the first back-side openings 10e have a circular shape. The first front-side openings 10d and the first back-side openings 10e may have the same size. The first back-side openings 10e may be larger than the first front-side openings 10d. The diameter of each of the first front-side openings 10d is taken as a "diameter D1".

As shown in FIG. 6, in the first metal plate 10, the plurality of holes (first penetration spaces 10c) are formed at positions corresponding to the lattice points of an orthogonal lattice at a pitch P1 (interval). The arrangement pattern of the plurality of holes (first penetration spaces 10c) may be an orthorhombic lattice or an equilateral-triangular lattice other than the orthogonal lattice. The plurality of holes can be arranged at intersection points of the diagonal lines in addition to the lattice points.

The second metal plate 20 is provided with a plurality of second penetration spaces 20c that pass through the second metal plate 20 from a second front face 20a, which is a face on the front side, to a second back face 20b, which is a face on the back side. The second penetration spaces 20c are holes with circular cross sections. The cross section of each of the second penetration spaces 20c may also have a rectangular shape, a triangular shape, a polygonal shape, or the like other than a circular shape or a substantially circular shape. These holes (second penetration spaces 20c) are formed in the second metal plate 20 through laser processing, punching processing, etching processing, or a combination thereof. The central axes of these holes are orthogonal to the second metal plate 20. It should be noted that the central axes of the holes (second penetration spaces 20c) may be inclined to the second metal plate 20. As the second example, an example is shown in which the diameter of each of the second penetration spaces 20c in the second metal plate 20 is equal to the diameter of each of the first penetration space 10c in the first metal plate 10. It should be noted that the diameter of each of the first penetration spaces 10c and the diameter of each of the second penetration spaces 20c may be different.

The openings of the second penetration spaces 20c formed in the second front face 20a are referred to as "second front-side openings 20d". The openings of the second penetration spaces 20c formed in the second back face 20b are referred to as "second back-side openings 20e". Since the second penetration spaces 20c are holes with circular cross sections, all of the second front-side openings 20d and the second back-side openings 20e have a circular shape. The second front-side openings 20d and the second back-side openings 20e may have the same size. The second back-side openings 20e may be larger than the second front-side openings 20d. The diameter of each of the second front-side openings 20d is taken as a "diameter D2".

In the second example, the diameter of each of the second penetration spaces 20c in the second metal plate 20 is equal to the diameter of each of the first penetration spaces 10c in the first metal plate 10. Accordingly, the diameter D1 of each of the first front-side openings 10d is equal to the diameter D2 of each of the second front-side openings 20d.

As shown in FIG. 6, in the second metal plate 20, the plurality of holes (second penetration spaces 20c) are formed at positions corresponding to the lattice points of an orthogonal lattice at a pitch P2 (interval). The arrangement pattern of the plurality of holes (second penetration spaces 20c) may be an orthorhombic lattice or an equilateral-triangular lattice other than the orthogonal lattice. The plurality of holes can be arranged at intersection points of the diagonal lines in addition to the lattice points.

In the second example, the pitch P2 of the second penetration spaces 20c in the second metal plate 20 is the same as the pitch P1 of the first penetration spaces 10c in the first metal plate 10. The first metal plate 10 and the second metal plate 20 are stacked and joined to each other such that the second penetration spaces 20c in the second metal plate 20 and the first penetration spaces 10c in the first metal plate 10 coincide as viewed from above. Accordingly, the first penetration spaces 10c are in communication with the second penetration spaces 20c. Each of penetration spaces 1c in the metal support 1 is constituted by the first penetration space 10c and the second penetration space 20c that are in communication with each other.

In the aspect of the second example, the thickness T of the metal support 1 is the sum of the thickness T1 of the first metal plate 10 and the thickness T2 of the second metal plate 20. It should be noted that, in the case where the metal support 1 is formed by stacking three or more metal plates, the thickness T of the metal support 1 is the sum of the thicknesses of these metal plates. Also, in the second example, the thickness T of the metal support 1 is preferably 0.1 mm or more, more preferably 0.15 mm or more, and even more preferably 0.2 mm or more. The thickness T of the metal support 1 is preferably 1.0 mm or less, more preferably 0.75 mm or less, and even more preferably 0.5 mm or less.

In the aspect of the second example, the diameter D1 of the front-side opening 10d of the first penetration space 10c in the first metal plate 10 corresponds to the diameter D of the front-side opening 1d in the aspect of the first example. The reason for this is that the first front face 10a of the first metal plate 10 corresponds to the front face 1a of the metal support 1 in the aspect of the first example. In the case where the electrochemical element E includes the metal support 1 of the second example, the electrode layer 2 is formed on the first front face 10a of the first metal plate 10. Also, in the second example, the diameter D1 of each of the front-side openings 10d is preferably 20 μm or more, more preferably 25 μm or more, and even more preferably 30 μm or more.

The diameter D1 of each of the front-side openings 10d is preferably 60 μm or less, more preferably 50 μm or less, and even more preferably 40 μm or less.

In the aspect of the second example, the pitch P1 of the first penetration spaces 10c in the first metal plate 10 corresponds to the arrangement pitch P of the penetration spaces 1c. The reason for this is that the first front face 10a of the first metal plate 10 corresponds to the front face 1a of the metal support 1 in the aspect of the first example. In the case where the electrochemical element E includes the metal support 1 of the second example, the electrode layer 2 is formed on the first front face 10a of the first metal plate 10. Also, in the second example, the arrangement pitch P of the penetration spaces 10c (holes) is preferably 0.05 mm or more, more preferably 0.1 mm or more, and even more preferably 0.15 mm or more. The arrangement pitch P of the penetration spaces 10c (holes) is preferably 0.3 mm or less, more preferably 0.25 mm or less, and even more preferably 0.2 mm or less.

In the aspect of the second example, the area S1 of each of the first front-side openings 10d in the first metal plate 10 corresponds to the area S of each of the front-side openings 1d of the penetration spaces 1c in the aspect of the first example. The reason for this is that the first front face 10a of the first metal plate 10 corresponds to the front face 1a of the metal support 1 in the aspect of the first example. In the case where the electrochemical element E includes the metal support 1 of the second example, the electrode layer 2 is formed on the first front face 10a of the first metal plate 10. Also, in the second example, the area S1 of each of the front-side openings 10d of the penetration spaces 10c is preferably $3.0 \times 10^{-4}$ mm² or more, more preferably $4.0 \times 10^{-4}$ mm² or more, and even more preferably $7.0 \times 10^{-4}$ mm² or more. Also, the area S1 of each of the front-side openings 10d of the penetration spaces 10c is preferably $3.0 \times 10^{-3}$ mm² or less, more preferably $2.0 \times 10^{-3}$ mm² or less, and even more preferably $1.5 \times 10^{-3}$ mm² or less.

Third Example

An example (third example) in which the metal support 1 is formed by stacking a plurality of metal plates having different thicknesses will be described with reference to FIG. 7. The metal support 1 according to the third example is obtained by changing the relationships between the dimensions of various portions in the metal support 1 according to the second example. In the description of the third example below, members similar to those in the second example are denoted by the same reference numerals, and the descriptions thereof may be omitted.

Figure 7:
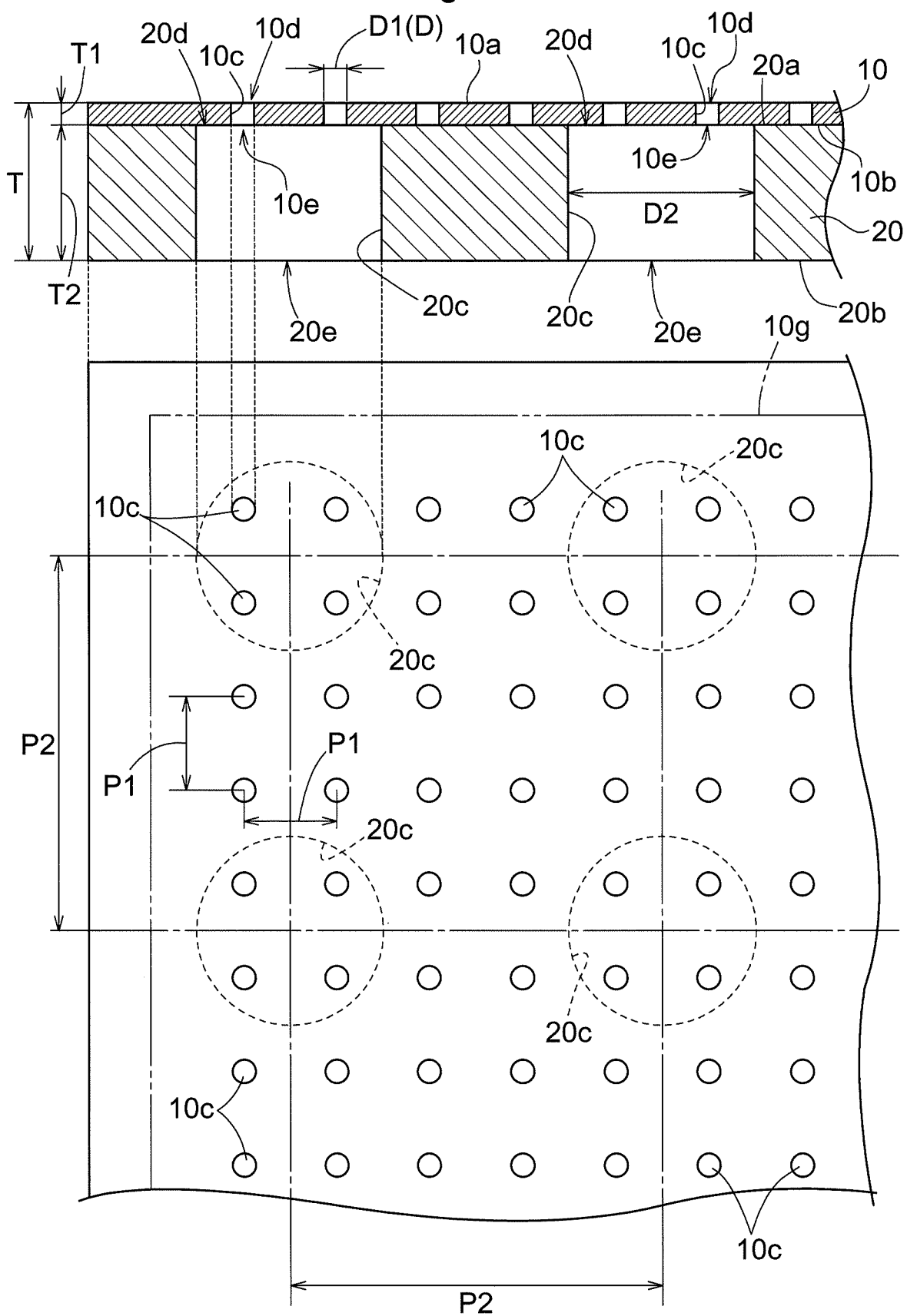
FIG. 7 shows a plan view and a cross-sectional view showing the structure of the metal support.

As shown in FIG. 7, in the third example, the metal support 1 is constituted by a first metal plate 10 having a thickness T1 and a second metal plate 20 having a thickness T2. The first metal plate 10 and the second metal plate 20 have different thicknesses, and the second metal plate 20 is thicker than the first metal plate 10. As shown in FIG. 7, in the third example, the thickness T2 is about five times larger than the thickness T1, for example.

In the third example, the diameter D2 of each of the second front-side openings 20d and the diameter D1 of each of the first front-side openings 10d are different values. The diameter D2 of each of the second front-side openings 20d is larger than the diameter D1 of each of the first front-side openings 10d. For example, the diameter D2 of each of the second front-side openings 20d is about eight times larger than the diameter D1 of each of the first front-side openings 10d.

In the third example, all of the first penetration spaces 10c in the first metal plate 10 and the second penetration spaces 20c in the second metal plate 20 are formed at positions corresponding to the lattice points of an orthogonal lattice. However, the arrangement pitches thereof, namely the pitch P1 of the first penetration spaces 10c and the pitch P2 of the second penetration spaces 20c, are different values. The pitch P2 of the second penetration spaces 20c is larger than the pitch P1 of the first penetration spaces 10c. For example, the pitch P2 is four times larger than the pitch P1.

Accordingly, in the metal support 1 of the third example, one second penetration space 20c is in communication with four first penetration spaces 10c as shown in FIG. 7. That is, also, in the third example, as in the second example, each of the penetration spaces 1c in the metal support 1 of the aspect of the first example is constituted by the first penetration space 10c and the second penetration space 20c that are in communication with each other.

Also, in the aspect of the third example, as in the second example, the diameter D1 of the first penetration space 10c in the first metal plate 10 corresponds to the diameter D of the front-side opening 1d in the aspect of the first example. The reason for this is that the first front face 10a of the first metal plate 10 corresponds to the front face 1a of the metal support 1 in the aspect of the first example. In the case where the electrochemical element E includes the metal support 1 of the third example, the electrode layer 2 is formed on the first front face 10a of the first metal plate 10. Also, in the third example, the diameter D1 of each of the front-side openings 10d is preferably 20 μm or more, more preferably 25 μm or more, and even more preferably 30 μm or more. The diameter D1 of each of the front-side openings 10d is preferably 60 μm or less, more preferably 50 μm or less, and even more preferably 40 μm or less.

Also, in the aspect of the third example, as in the second example, the pitch P1 of the first penetration spaces 10c in the first metal plate 10 corresponds to the arrangement pitch P of the penetration spaces 1c in the aspect of the first example. The reason for this is that the first front face 10a of the first metal plate 10 corresponds to the front face 1a of the metal support 1 in the aspect of the first example. In the case where the electrochemical element E includes the metal support 1 of the third example, the electrode layer 2 is formed on the first front face 10a of the first metal plate 10. Also, in the third example, the arrangement pitch P1 of the penetration spaces 10c (holes) is preferably 0.05 mm or more, more preferably 0.1 mm or more, and even more preferably 0.15 mm or more. The arrangement pitch P1 of the penetration spaces 10c (holes) is preferably 0.3 mm or less, more preferably 0.25 mm or less, and even more preferably 0.2 mm or less.

Also, in the aspect of the third example, as in the second example, the area S1 of each of the first front-side openings 10d in the first metal plate 10 corresponds to the area S of each of the front-side openings 1d of the penetration spaces 1c in the aspect of the first example. The reason for this is that the first front face 10a of the first metal plate 10 corresponds to the front face 1a of the metal support 1 in the aspect of the first example. In the case where the electrochemical element E includes the metal support 1 of the third example, the electrode layer 2 is formed on the first front face 10a of the first metal plate 10. Also, in the third example, the area S1 of each of the front-side openings 10d of the penetration spaces 10c is preferably $3.0 \times 10^{-4}$ mm² or more, more preferably $4.0 \times 10^{-4}$ mm² or more, and even more preferably $7.0 \times 10^{-4}$ mm² or more. Also, the area S1 of each of the front-side openings 10d of the penetration spaces

10c is preferably $3.0 \times 10^{-3}$ mm$^2$ or less, more preferably $2.0 \times 10^{-3}$ mm$^2$ or less, and even more preferably $1.5 \times 10^{-3}$ mm$^2$ or less.

It should be noted that the metal support 1 or at least one of the first metal plate 10 and the second metal plate 20 may be constituted by a metal plate obtained by processing a metal mesh into a plate shape through rolling processing, a plate-like expanded metal, or a metal plate obtained by rolling an expanded metal. A metal mesh is a sheet-like member formed by knitting metal thin wires and is provided with spaces between the knitted thin wires, and each of the spaces includes a portion (through hole) that passes through the metal mesh in the thickness direction. A metal plate provided with through holes passing therethrough in the thickness direction can be formed by processing a metal mesh into a plate shape through rolling processing. An expanded metal is a sheet-like member obtained by forming rifts in a metal plate and widening the rifts into a rhombic shape, a hexagonal shape, or the like. The portions formed into a rhombic shape, a hexagonal shape, or the like by widening rifts are portions (through holes) passing through the expanded metal in the thickness direction. A metal plate provided with through holes passing therethrough in the thickness direction can also be formed by rolling an expanded metal. In these cases, the through holes may have various shapes, but the diameter of a circle having the same area as the area of the opening of each of the through holes formed in the surface of a metal plate obtained by rolling a metal mesh, a plate-like expanded metal, or a metal plate obtained by rolling an expanded metal is calculated, and the calculated diameter can be used as the diameter (inner diameter) of the through hole. When the metal support 1 is constituted by the first metal plate 10 and the second metal plate 20, and the thickness of the second metal plate 20 is larger than the thickness of the first metal plate 10, it is preferable to use a metal plate obtained by processing a metal mesh into a plate shape through rolling processing, a plate-like expanded metal, or a metal plate obtained by rolling an expanded metal as the relatively thick second metal plate 20.

Electrode Layer:

As shown in FIG. 1, the electrode layer 2 can be provided as a thin layer in a region that is larger than the region provided with the penetration spaces 1c, on the front face of the metal support 1. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the amount of expensive electrode layer material that is used. The region provided with the penetration spaces 1c is entirely covered by the electrode layer 2. That is, the penetration spaces 1c are formed inside the region of the metal support 1 in which the electrode layer 2 is formed. In other words, all the penetration spaces 1c are provided facing the electrode layer 2.

A composite material such as NiO-GDC, Ni-GDC, NiO—YSZ, Ni—YSZ, CuO—CeO$_2$, or Cu—CeO$_2$ can be used as the material for forming the electrode layer 2, for example. In these examples, GDC, YSZ, and CeO$_2$ can be called the aggregate of the composite material. It should be noted that it is preferable to form the electrode layer 2 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using calcining in a high temperature range of higher than 1100° C., for example. Therefore, this is preferable due to being able to prevent damage to the metal support 1, suppress element interdiffusion between the metal support 1 and the electrode layer 2, and realize an electrochemical element that has excellent durability. Furthermore, using low-temperature calcining makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1—porosity", and is equivalent to relative density.

Intermediate Layer:

As shown in FIG. 1, the intermediate layer 3 (intervening layer) can be formed as a thin layer on the electrode layer 2 so as to cover the electrode layer 2. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the amount of expensive intermediate layer material that is used. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 3. In particular, ceria-based ceramics are favorably used.

It is preferable to form the intermediate layer 3 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent durability. Furthermore, using low-temperature calcining makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Electrolyte Layer:

As shown in FIG. 1, the electrolyte layer 4 is formed as a thin layer on the intermediate layer 3 so as to cover the electrode layer 2 and the intermediate layer 3. The electrolyte layer 4 can also be formed as a thin film having a thickness of 10 μm or less. Specifically, as shown in FIG. 1, the electrolyte layer 4 is provided on both the intermediate layer 3 and the metal support 1 (spanning the intermediate layer 3 and the metal support 1). Configuring the electrolyte layer 4 in this manner and joining the electrolyte layer 4 to the metal support 1 make it possible to allow the electrochemical element to have excellent toughness as a whole.

Also, as shown in FIG. 1, the electrolyte layer 4 is provided in a region that is larger than the region provided with the penetration spaces 1c, on the front face of the metal support 1. That is, the penetration spaces 1c are formed inside the region of the metal support 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constitutional element of a SOFC, gas is supplied from the back side of the metal support 1 through the penetration spaces 1c to the electrode layer 2 during the operation of the SOFC. In a region where the electrolyte layer 4 is in contact with the metal support 1, leakage of gas can be suppressed without providing another member such as a gasket. It should be noted that, although the entire vicinity of the electrode layer 2 is covered by the electrolyte layer 4 in this embodiment, a configuration in which the electrolyte layer 4 is provided on the electrode layer 2 and the intermediate layer 3 and a gasket or the like is provided in its vicinity may also be adopted.

Electrolyte materials having oxygen ion conductivity such as YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like, and electrolyte materials having hydrogen ion conductivity such as perovskite oxides can be used as the material of the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics and various materials having hydrogen ion conductivity are used. For example, when the electrochemical element E is used in the SOFC, by adopting a system configuration in which a material such as YSZ that can exhibit high electrolyte performance even in a high temperature range of approximately 650° C. or higher is used as the material of the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 4 that is dense and has high gas-tightness and gas barrier properties is obtained without using calcining in a high temperature range of higher than 1100° C., for example. Therefore, it is possible to prevent damage to the metal support 1, suppress element interdiffusion between the metal support 1 and the electrode layer 2, and realize an electrochemical element E that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer:

The reaction preventing layer 5 can be formed as a thin layer on the electrolyte layer 4. When it is formed as a thin layer, the thickness can be set to approximately 1 μm to 100 μm, preferably approximately 2 μm to 50 μm, and more preferably approximately 3 μm to 15 μm, for example. This thickness makes it possible to ensure sufficient performance while also achieving cost reduction by reducing the amount of expensive reaction preventing layer material that is used. The material of the reaction preventing layer 5 need only be capable of preventing reactions between the component of the electrolyte layer 4 and the component of the counter electrode layer 6. For example, a ceria-based material or the like is used. Materials that contain at least one element selected from the group consisting of Sm, Gd, and Y are favorably used as the material of the reaction preventing layer 5. It is preferable that at least one element selected from the group consisting of Sm, Gd, and Y is contained, and the total content of these elements is 1.0 mass % or more and 10 mass % or less. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the reaction preventing layer 5 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer:

The counter electrode layer 6 can be formed as a thin layer on the electrolyte layer 4 or the reaction preventing layer 5. When it is formed as a thin layer, the thickness can be set to approximately 1 μm to 100 μm, and preferably approximately 5 μm to 50 μm, for example. This thickness makes it possible to ensure sufficient electrode performance while also achieving cost reduction by reducing the amount of expensive counter electrode layer material that is used. A complex oxide such as LSCF or LSM, or a ceria-based oxide, or a mixture thereof can be used as the material of the counter electrode layer 6, for example. In particular, it is preferable that the counter electrode layer 6 includes a perovskite oxide containing two or more elements selected from the group consisting of La, Sr, Sm, Mn, Co, and Fe. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal support 1, suppress element interdiffusion between the metal support 1 and the electrode layer 2, and realize an electrochemical element E that has excellent performance and durability, and is thus preferable. For example, the counter electrode layer 6 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Solid Oxide Fuel Cell:

By configuring the electrochemical reaction element E as described above, the electrochemical element E can be used as a power generating cell for a solid oxide fuel cell when the electrochemical element is allowed to function as a fuel cell (electrochemical power generating cell). For example, fuel gas containing hydrogen is allowed to flow from the back surface of the metal support 1 through the penetration spaces 1c to the electrode layer 2, air is allowed to flow to the counter electrode layer 6 serving as a counter electrode of the electrode layer 2, and the operation is performed at a temperature of 500° C. or higher and 900° C. or lower, for example. Accordingly, the oxygen $O_2$ included in air reacts with electrons $e^-$ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons $e^-$.

When the electrolyte layer 4 is made of an electrolyte material having hydrogen ion conductivity, hydrogen $H_2$ included in the fuel gas flowing in the electrode layer 2 releases electrons $e^-$, thus producing hydrogen ions $H^+$. The hydrogen ions $H^+$ move to the counter electrode layer 6 through the electrolyte layer 4. In the counter electrode layer 6, oxygen $O_2$ included in air, hydrogen ions $H^+$, and electrons $e^-$ react with each other to produce water $H_2O$.

With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Method for Manufacturing Electrochemical Element:

Next, a method for manufacturing the electrochemical element E will be described.

Electrode Layer Forming Step:

In an electrode layer forming step, the electrode layer 2 is formed as a thin film in a region that is broader than the region provided with the penetration spaces 1c, on the front face of the metal support 1. The through holes of the metal support 1 can be provided through laser processing or the like. As described above, the electrode layer 2 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the electrode layer forming step. First, a material paste is produced by mixing powder of the material of the electrode layer 2 and a solvent (dispersion medium), and is applied to the front face of the metal support 1. Then, the electrode layer 2 is obtained through compression molding (electrode layer smoothing step) and calcining at a temperature of 1100° C. or lower (electrode layer calcining step). Examples of compression molding of the electrode layer 2 include CIP (Cold Isostatic Pressing) molding, roll pressing molding, and RIP (Rubber Isostatic Pressing) molding. It is favorable to perform calcining of the electrode layer 2 at a temperature of 800° C. or higher and 1100° C. or lower. The order in which the electrode layer smoothing step and the electrode layer calcining step are performed can be changed.

It should be noted that, when an electrochemical element including an intermediate layer 3 is formed, the electrode layer smoothing step and the electrode layer calcining step may be omitted, and an intermediate layer smoothing step and an intermediate layer calcining step, which will be described later, may include the electrode layer smoothing step and the electrode layer calcining step.

It should be noted that lapping molding, leveling treatment, surface cutting treatment, surface polishing treatment, or the like can also be performed as the electrode layer smoothing step.

Diffusion Suppressing Layer Forming Step:

The metal oxide layer 1$f$ (diffusion suppressing layer) is formed on the surface of the metal support 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer 1$f$ (diffusion suppressing layer) that has a high element interdiffusion suppressing effect and has a low resistance value is formed. In a case where a coating method that does not include calcining is performed as the electrode layer forming step, a separate diffusion suppressing layer forming step may also be included. In any case, it is desirable to perform these steps at a temperature of 1100° C. or lower such that damage to the metal support 1 can be suppressed. The metal oxide layer 1$f$ (diffusion suppressing layer) may be formed on the surface of the metal support 1 during the calcining step in an intermediate layer forming step, which will be described later.

Intermediate Layer Forming Step:

In an intermediate layer forming step, the intermediate layer 3 is formed as a thin layer on the electrode layer 2 so as to cover the electrode layer 2. As described above, the intermediate layer 3 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

The following is a specific example of the case where low-temperature calcining is performed as the intermediate layer forming step.

First, a material paste is produced by mixing powder of the material of the intermediate layer 3 and a solvent (dispersion medium), and is applied to the front face of the metal support 1. Then, the intermediate layer 3 is obtained through compression molding (intermediate layer smoothing step) and calcining at a temperature of 1100° C. or lower (intermediate layer calcining step). Examples of rolling of the intermediate layer 3 include CIP (Cold Isostatic Pressing) molding, roll pressing molding, and RIP (Rubber Isostatic Pressing) molding. It is favorable to perform calcining of the intermediate layer 3 at a temperature of 800° C. or higher and 1100° C. or lower. The reason for this is that this temperature makes it possible to form an intermediate layer 3 that has high strength while suppressing damage to and deterioration of the metal support 1. It is more preferable to perform calcining of the intermediate layer 3 at a temperature of 1050° C. or lower, and more preferably 1000° C. or lower. The reason for this is that the lower the calcining temperature of the intermediate layer 3 is, the more likely it is to further suppress damage to and deterioration of the metal support 1 when forming the electrochemical element E. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step:

In an electrolyte layer forming step, the electrolyte layer 4 is formed as a thin layer on the intermediate layer 3 so as to cover the electrode layer 2 and the intermediate layer 3. The electrolyte layer 4 may also be formed as a thin film having a thickness of 10 μm or less. As described above, the electrolyte layer 4 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

It is desirable to perform a spray coating technique as the electrolyte layer forming step in order to form a high-quality electrolyte layer 4 that is dense and has high gas-tightness and gas barrier properties in a temperature range of 1100° C. or lower. In this case, the material of the electrolyte layer 4 is sprayed onto the intermediate layer 3 on the metal support 1, and the electrolyte layer 4 is thus formed.

Reaction Preventing Layer Forming Step:

In a reaction preventing layer forming step, the reaction preventing layer 5 is formed as a thin layer on the electrolyte layer 4. As described above, the reaction preventing layer 5 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1. It should be noted that leveling treatment, surface cutting treatment, or surface polishing treatment may be performed after the formation of the reaction preventing layer 5, or pressing processing may be performed after wet formation and before calcining in order to flatten the top face of the reaction preventing layer 5.

Counter Electrode Layer Forming Step:

In a counter electrode layer forming step, the counter electrode layer 6 is formed as a thin layer on the reaction preventing layer 5. As described above, the counter electrode layer 6 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 1.

In this manner, the electrochemical element E can be manufactured.

It should be noted that a configuration is also possible in which the electrochemical element E does not include both or either of the intermediate layer 3 (intervening layer) and the reaction preventing layer 5. That is, a configuration is also possible in which the electrode layer 2 and the electrolyte layer 4 are in contact with each other, or a configuration is also possible in which the electrolyte layer 4 and the counter electrode layer 6 are in contact with each other. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

Working Example 1

A circular crofer 22 APU metal plate (metal support 1) having a thickness of 0.3 mm and a diameter of 25 mm was provided with a plurality of penetration spaces 1c through laser processing in a region having a radius of 2.5 mm from the center of the metal plate, and a metal support 1 was thus produced. The penetration spaces 1c were provided at positions corresponding to the lattice points of an orthogonal lattice. It should be noted that the diameter of each of the front-side openings 1d was 30 μm, the pitch P was 115 μm, and the area of each of the front-side openings 1d was $7.0 \times 10^{-4}$ mm$^2$.

Next, a paste was produced by mixing 60 wt % of NiO powder and 40 wt % of GDC powder and adding an organic binder and an organic solvent (dispersion medium) thereto. This paste was used to form an electrode layer 2 through screen printing. It should be noted that the electrode layer 2 was formed on a region having a radius of 3 mm from the center of the metal support 1. Then, the metal support 1 on which the electrode layer 2 had been formed was calcined at 950° C. (the electrode layer forming step, the diffusion suppressing layer forming step).

Next, a paste was produced by adding an organic binder and an organic solvent (dispersion medium) to GDC fine powder. This paste was used to form an intermediate layer 3 on a region having a radius of 5 mm from the center of the metal support 1 on which the electrode layer 2 had been formed, through screen printing. Then, the metal support 1 on which the intermediate layer 3 had been formed was subjected to CIP molding and then calcined at 1000° C., and thus intermediate layer 3 having a flat surface was produced. (the intermediate layer forming step).

The thicknesses of the electrode layer 2 and the intermediate layer 3 obtained through the above-described steps were about 14 μm and about 9 μm, respectively. The He leakage amount of the metal support 1 on which the electrode layer 2 and the intermediate layer 3 had been formed as described above was 11.5 mL/minute·cm$^2$ under a pressure of 0.2 MPa. It was found from this result that the metal support 1 on which the electrode layer 2 and the intermediate layer 3 had been formed could be considered as a substrate with an electrode layer having gas permeability.

Subsequently, an electrolyte layer 4 was formed by spraying an 8YSZ (yttria-stabilized zirconia) component having a mode diameter of about 0.7 μm onto a 15 mm×15 mm region of the intermediate layer 3 of the metal support 1 so as to cover the intermediate layer 3 while the substrate was moved at a scanning speed of 5 mm/second (spray coating). It should be noted that, at this time, the metal support 1 was not calcined (the electrolyte layer forming step).

The thickness of the electrolyte layer 4 obtained through the above-described step was about 3 μm. The He leakage amount of the metal substrate 1 on which the electrode layer 2, the intermediate layer 3, and the electrolyte layer 4 were formed was measured under a pressure of 0.2 MPa. The determined He leakage amount was smaller than the lower detection limit (1.0 mL/minute·cm$^2$). Accordingly, it was found that the formed electrolyte layer 4 had gas barrier properties.

Next, a paste was produced by adding an organic binder and an organic solvent (dispersion medium) to GDC fine powder. This paste was used to form a reaction preventing layer 5 on the electrolyte layer 4 of the electrochemical element E through screen printing.

Then, the electrochemical element E on which the reaction preventing layer 5 had been formed was subjected to CIP molding and then calcined at 1000° C. for 1 hour, and thus reaction preventing layer 5 having a flat surface was produced (the reaction preventing layer forming step).

Furthermore, a paste was produced by mixing GDC powder and LSCF powder and adding an organic binder and an organic solvent (dispersion medium) thereto. This paste was used to form a counter electrode layer 6 on the reaction preventing layer 5 through screen printing. Lastly, a final electrochemical element E was obtained by calcining, at 900° C., the electrochemical element E on which the counter electrode layer 6 had been formed (the counter electrode layer forming step).

Working Example 2

An electrochemical element E in which the thickness of the electrode layer 2 was about 25 μm, the thickness of the intermediate layer 3 was about 9 μm, and the thickness of the electrolyte layer 4 was about 9 μm was obtained in the same manner as in Working Example 1 using a metal support 1 similar to that in Working Example 1 in which the diameter of each of the front-side openings 1d was 30 μm, the pitch P was 115 μm, and the area of each of the front-side openings 1d was $7.0 \times 10^{-4}$ mm$^2$, except that the calcining temperature in the electrode layer forming step was changed to 850° C. and the calcining temperature in the intermediate layer forming step was changed to 1050° C.

Working Example 3

A metal plate similar to that in Working Example 1 was used, and penetration spaces 1c were formed. In this example, the hole size and the intervals between the holes were different from those in Working Example 1. It should be noted that the penetration spaces 1c were provided at positions corresponding to the lattice points of an orthogonal lattice, the diameter of each of the front-side openings 1d was 20 μm, the pitch P was 200 μm, and the area of each of the front-side openings 1d was $3.1 \times 10^{-4}$ mm$^2$. An electrochemical element E in which the thickness of the electrode layer 2 was about 10 μm, the thickness of the intermediate layer 3 was about 7 μm, and the thickness of the electrolyte layer 4 was about 4 μm was obtained in the same manner as in Working Example 1, except that this metal support 1 was used and the calcining temperature in the electrode layer forming step was changed to 850° C.

Comparative Example 1

An attempt was made to manufacture an electrochemical element E in the same manner as in Working Example 1 using a circular SUS430 metal plate (metal support 1) having a thickness of 0.8 mm and a diameter of 25 mm in which holes had been formed through punching such that the diameter of each of the front-side openings $1d$ was 630 μm, the pitch P was 1250 μm, and the area of each of the front-side openings $1d$ was $3.0 \times 10^{-1}$ mm$^2$. However, the electrode layer 2, the intermediate layer 3, and the like could not be formed without defects, and thus the product was unable to function as the electrochemical element E.

The obtained electrochemical elements E of Working Examples 1 to 3 were used, and the power generation performance thereof as a solid oxide fuel cell was measured at an operation temperature of 750° C. by supplying fuel gas and air to the electrode layer 2 and the counter electrode layer 6, respectively. Table 1 below shows the results. It should be noted that the unit of the OCV (open circuit voltage) is V. The current density is a value obtained through the measurement at 0.8 V, and the unit thereof is mA/cm$^2$.

It is clear from the results shown in Table 1 that the electrochemical elements E of Working Examples 1 to 3 were favorable because a large current density was obtained.

TABLE 1

|  | Area (mm$^2$) | OCV (V) | Current Density (mA/cm$^2$) | Fuel gas |
|---|---|---|---|---|
| Work. Ex. 1 | $7.0 \times 10^{-4}$ | 1.07 | 880 | 30° C. humidified H$_2$ |
| Work. Ex. 2 | $7.0 \times 10^{-4}$ | 1.15 | 870 | Dry H$_2$ |
| Work. Ex. 3 | $3.1 \times 10^{-4}$ | 1.04 | 625 | 30° C. humidified H$_2$ |

Second Embodiment

An electrochemical element E, an electrochemical module M, an electrochemical device Y, and an energy system Z according to a second embodiment will be described with reference to FIGS. 2 and 3.

Figure 2:
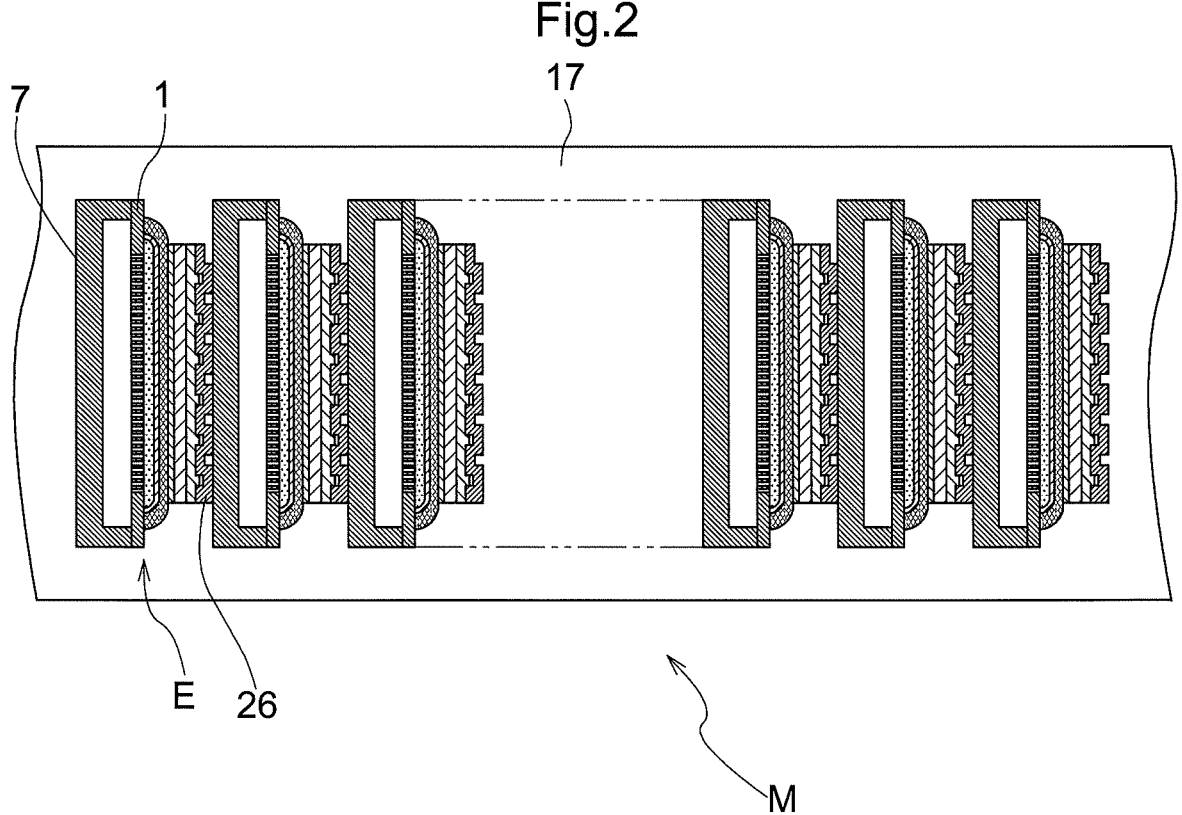
FIG. 2 is a schematic diagram showing configurations of electrochemical elements and an electrochemical module.

As shown in FIG. 2, in the electrochemical element E according to the second embodiment, a U-shaped member 7 is attached to the back face of the metal support 1, and the metal support 1 and the U-shaped member 7 form a tubular support.

The electrochemical module M is configured by stacking (assembling) a plurality of electrochemical elements E with collector members 26 being sandwiched therebetween. Each of the collector members 26 is joined to the counter electrode layer 6 of the electrochemical element E and the U-shaped member 7, and electrically connects them. It should be noted that a configuration may also be employed in which the collector members 26 are omitted, and the counter electrode layers 6 of the electrochemical elements E are electrically connected directly to the U-shaped members 7.

The electrochemical module M includes a gas manifold 17, the collector members 26, a terminal member, and a current extracting unit. One open end of each tubular support in the stack of the plurality of electrochemical elements E is connected to the gas manifold 17, and gas is supplied from the gas manifold 17 to the electrochemical elements E. The supplied gas flows inside the tubular supports, and is supplied to the electrode layers 2 through the penetration spaces $1c$ of the metal supports 1.

Figure 3:
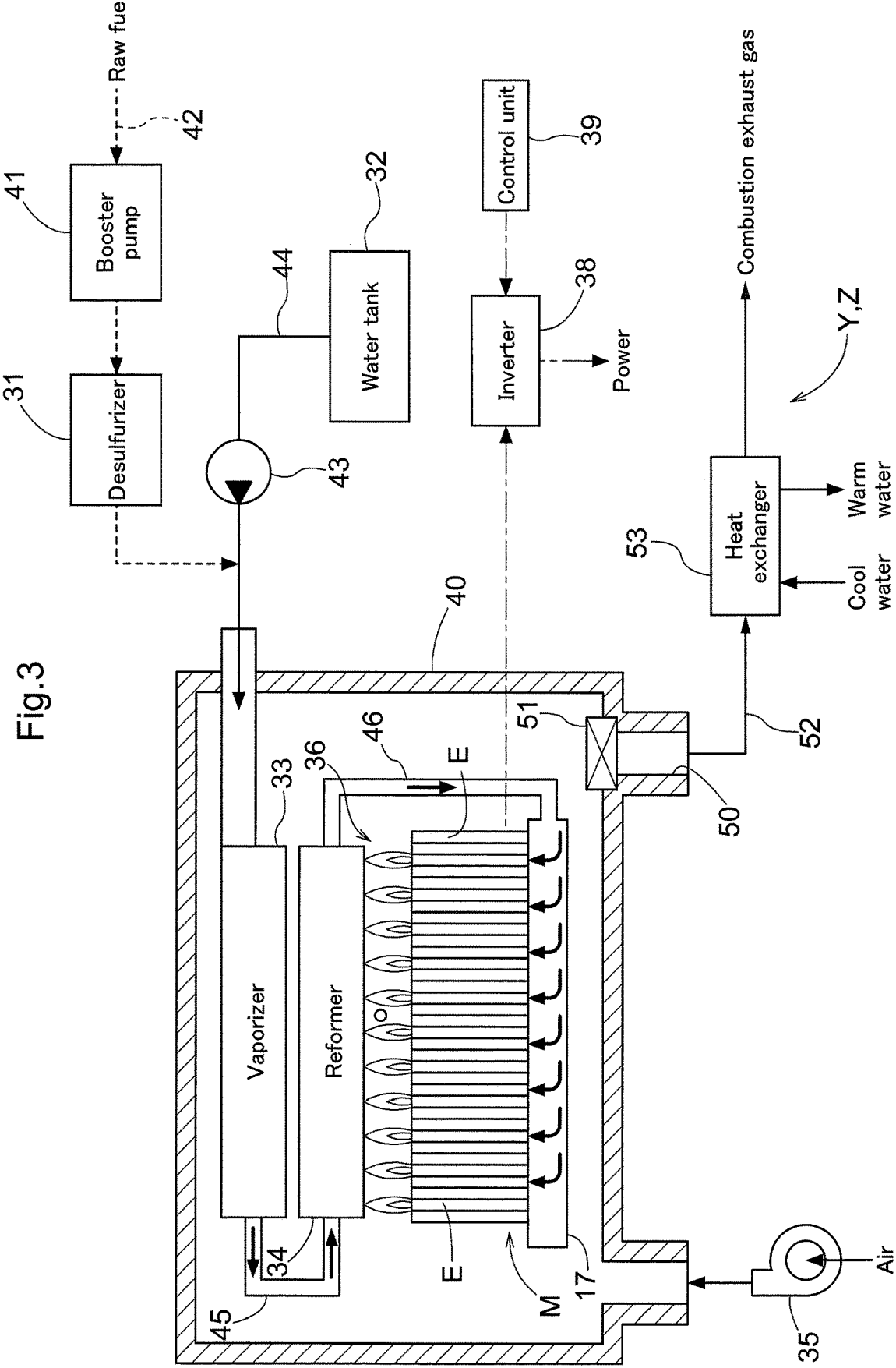
FIG. 3 is a schematic diagram showing configurations of an electrochemical device and an energy system.

FIG. 3 shows an overview of the energy system Z and the electrochemical device Y.

The energy system Z includes the electrochemical device Y, and a heat exchanger 53 serving as a waste heat utilization system that reuses heat discharged from the electrochemical device Y.

The electrochemical device Y includes the electrochemical module M and a fuel converter including a desulfurizer 31 and a reformer 34, and includes a fuel supply unit that supplies fuel gas containing a reducing component to the electrochemical module M, and an inverter 38 (an example of a power converter) that extracts power from the electrochemical module M.

Specifically, the electrochemical device Y includes the desulfurizer 31, a water tank 32, a vaporizer 33, the reformer 34, a blower 35, a combustion unit 36, the inverter 38, a control unit 39, a storage container 40, and the electrochemical module M.

The desulfurizer 31 removes sulfur compound components contained in a hydrocarbon-based raw fuel such as city gas (i.e., performs desulfurization). When a sulfur compound is contained in the raw fuel, the inclusion of the desulfurizer 31 makes it possible to suppress the influence that the sulfur compound has on the reformer 34 or the electrochemical elements E. The vaporizer 33 produces water vapor (steam) from water supplied from the water tank 32. The reformer 34 uses the water vapor (steam) produced by the vaporizer 33 to perform steam reforming of the raw fuel desulfurized by the desulfurizer 31, thus producing reformed gas containing hydrogen.

The electrochemical module M generates power by causing an electrochemical reaction to occur with use of the reformed gas supplied from the reformer 34 and air supplied from the blower 35. The combustion unit 36 mixes the reaction exhaust gas discharged from the electrochemical module M with air, and burns combustible components in the reaction exhaust gas.

The electrochemical module M includes a plurality of electrochemical elements E and the gas manifold 17. The electrochemical elements E are arranged side-by-side and electrically connected to each other, and one end portion (lower end portion) of each of the electrochemical elements E is fixed to the gas manifold 17. The electrochemical elements E generate power by causing an electrochemical reaction to occur between the reformed gas supplied via the gas manifold 17 and air supplied from the blower 35.

The inverter 38 adjusts the power output from the electrochemical module M to obtain the same voltage and frequency as electrical power received from a commercial system (not shown). The control unit 39 controls the operation of the electrochemical device Y and the energy system Z.

The vaporizer 33, the reformer 34, the electrochemical module M, and the combustion unit 36 are stored in the storage container 40. The reformer 34 performs reforming process on the raw fuel with use of combustion heat produced by the combustion of reaction exhaust gas in the combustion unit 36.

The raw fuel is supplied to the desulfurizer 31 via a raw fuel supply passage 42, due to operation of a booster pump 41. The water in the water tank 32 is supplied to the vaporizer 33 via a water supply passage 44, due to operation of a water pump 43. The raw fuel supply passage 42 merges with the water supply passage 44 at a location on the downstream side of the desulfurizer 31, and the water and the raw fuel, which have been merged outside of the storage container 40, are supplied to the vaporizer 33 provided in the storage container 40.

The water is vaporized by the vaporizer 33 to produce water vapor. The raw fuel, which contains the water vapor produced by the vaporizer 33, is supplied to the reformer 34 via a vapor-containing raw fuel supply passage 45. In the reformer 34, the raw fuel is subjected to steam reforming, thus producing reformed gas that includes hydrogen gas as a main component (first gas including a reducing component). The reformed gas produced in the reformer 34 is supplied to the gas manifold 17 of the electrochemical module M via a reformed gas supply passage 46.

The reformed gas supplied to the gas manifold 17 is distributed among the electrochemical elements E, and is supplied to the electrochemical elements E from the lower ends, which are the connection portions where the electrochemical elements E and the gas manifold 17 are connected to each other. Mainly the hydrogen (reducing component) in the reformed gas is used in the electrochemical reaction in the electrochemical elements E. The reaction exhaust gas, which contains remaining hydrogen gas not used in the reaction, is discharged from the upper ends of the electrochemical elements E to the combustion unit 36.

The reaction exhaust gas is burned in the combustion unit 36, and combustion exhaust gas is discharged from a combustion exhaust gas outlet 50 to the outside of the storage container 40. A combustion catalyst unit 51 (e.g., a platinum-based catalyst) is provided in the combustion exhaust gas outlet 50, and reducing components such as carbon monoxide and hydrogen contained in the combustion exhaust gas are removed by combustion. The combustion exhaust gas discharged from the combustion exhaust gas outlet 50 is sent to the heat exchanger 53 via a combustion exhaust gas discharge passage 52.

The heat exchanger 53 uses supplied cool water to perform heat exchange on the combustion exhaust gas produced by combustion in the combustion unit 36, thus producing warm water. In other words, the heat exchanger 53 operates as a waste heat utilization system that reuses heat discharged from the electrochemical device Y.

It should be noted that instead of the waste heat utilization system, it is possible to provide a reaction exhaust gas using unit that uses the reaction exhaust gas that is discharged from (not burned in) the electrochemical module M. The reaction exhaust gas contains remaining hydrogen gas that was not used in the reaction in the electrochemical elements E. In the reaction exhaust gas using unit, the remaining hydrogen gas is used to perform heat utilization through combustion or power generation by a fuel cell and so on, thus achieving effective energy utilization.

Third Embodiment

Figure 4:
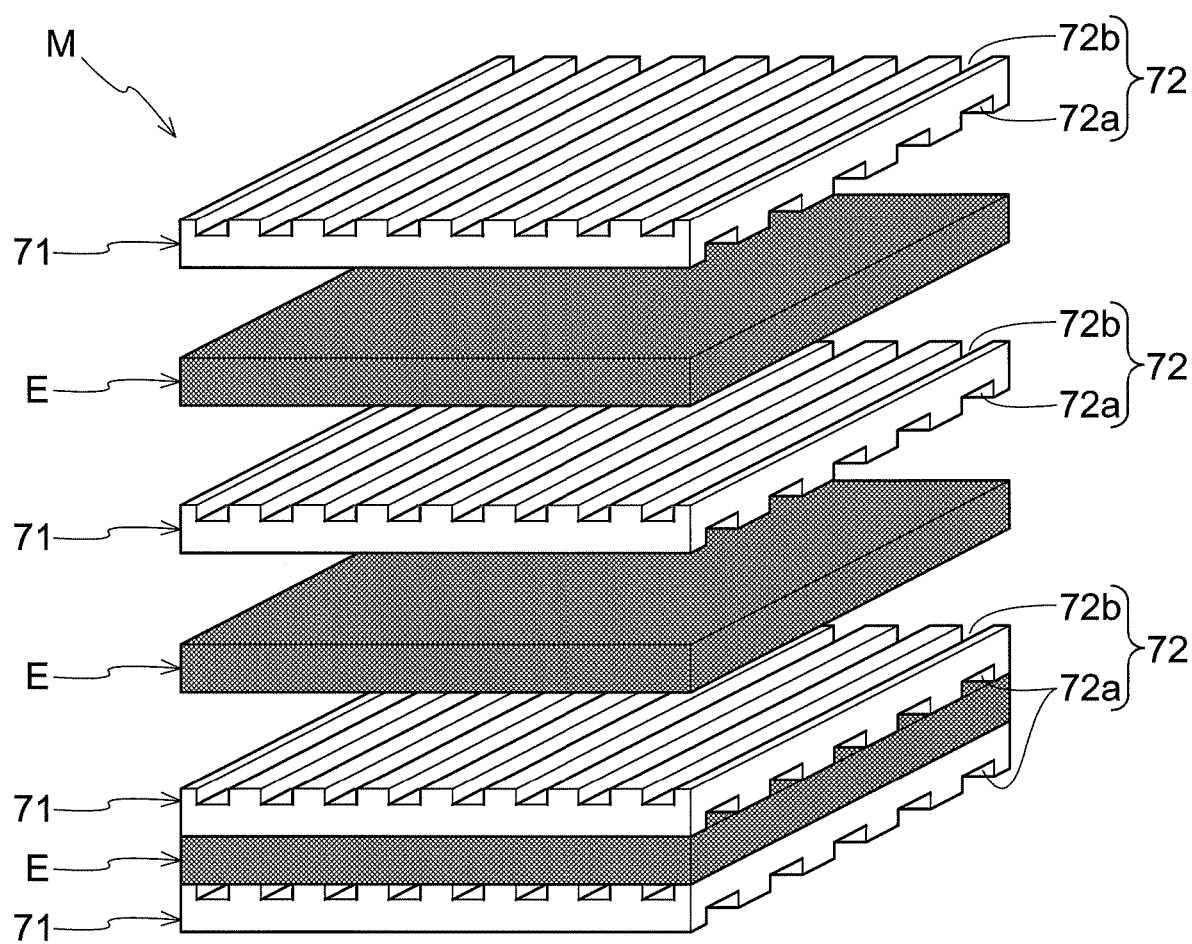
FIG. 4 is a schematic diagram showing a configuration of an electrochemical module.

FIG. 4 shows another embodiment of the electrochemical module M. The electrochemical module M according to a third embodiment is configured by stacking the above-described electrochemical elements E with cell connecting members 71 being sandwiched therebetween.

Each of the cell connecting members 71 is a plate-like member that has electrical conductivity and does not have gas permeability, and the upper face and the lower face are respectively provided with grooves 72 that are orthogonal to each other. The cell connecting members 71 can be formed using a metal such as stainless steel or a metal oxide.

As shown in FIG. 4, when the electrochemical elements E are stacked with the cell connecting members 71 being sandwiched therebetween, a gas can be supplied to the electrochemical elements E through the grooves 72. Specifically, the grooves 72 on one side are first gas passages 72a and supply gas to the front side of one electrochemical element E, that is to say, the counter electrode layer 6. The grooves 72 on the other side are second gas passages 72b and supply gas from the back side of one electrochemical element E, that is, the back face of the metal support 1, through the penetration spaces 1c to the electrode layers 2.

In the case of operating this electrochemical module M as a fuel cell, oxygen is supplied to the first gas passages 72a, and hydrogen is supplied to the second gas passages 72b. Accordingly, a fuel cell reaction progresses in the electrochemical elements E, and electromotive force and electrical current are generated. The generated power is extracted to the outside of the electrochemical module M from the cell connecting members 71 at the two ends of the stack of electrochemical elements E.

It should be noted that although the grooves 72 that are orthogonal to each other are respectively formed on the front face and the back face of each of the cell connecting members 71 in Third Embodiment, grooves 72 that are parallel to each other can be respectively formed on the front face and the back face of each of the cell connecting members 71.

Other Embodiments (1) Although the electrochemical elements E are used in a solid oxide fuel cell in the above-mentioned embodiments, the electrochemical elements E can also be used in a solid oxide electrolytic (electrolysis) cell, an oxygen sensor using a solid oxide, and the like.

That is, in the above-mentioned embodiments, a configuration that can improve the efficiency of converting chemical energy such as fuel into electric energy is described.

In other words, in the above-mentioned embodiments, the electrochemical elements E and the electrochemical module M are operated as fuel cells, and hydrogen gas flows to the electrode layer 2 and oxygen gas flows to the counter electrode layer 6. Accordingly, oxygen molecules $O_2$ react with electrons $e^-$ to produce oxygen ions $O^{2-}$ in the counter electrode layer 6. The oxygen ions $O^{2-}$ move to the electrode layer 2 through the electrolyte layer 4. In the electrode layer 2, hydrogen molecules $H_2$ react with oxygen ions $O^{2-}$ to produce water $H_2O$ and electrons $e^-$. With these reactions, electromotive force is generated between the electrode layer 2 and the counter electrode layer 6, and power is generated.

On the other hand, when the electrochemical elements E and the electrochemical module M are operated as electrolytic cells, gas containing water vapor and carbon dioxide flows to the electrode layer 2, and a voltage is applied between the electrode layer 2 and the counter electrode layer 6. As a result, in the electrode layer 2, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer 6 through the electrolyte layer 4. In the counter electrode layer 6, the oxygen ions $O^{2-}$ release electrons and oxygen molecules $O_2$ are produced. Through the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide molecules CO and oxygen $O_2$.

In the case where gas containing water vapor and carbon dioxide molecules $CO_2$ flows, a fuel converter 91 that synthesizes various compounds such as hydrocarbons from hydrogen, carbon monoxide, and the like generated through the above-mentioned electrolysis in the electrochemical elements E and the electrochemical module M can be provided. With the fuel supply unit (not shown), hydrocarbon and the like produced by this fuel converter 91 can flow to the electrochemical elements E and the electrochemical module M or can be extracted from the system and the device and separately used as fuel or a chemical raw material.

Figure 8:
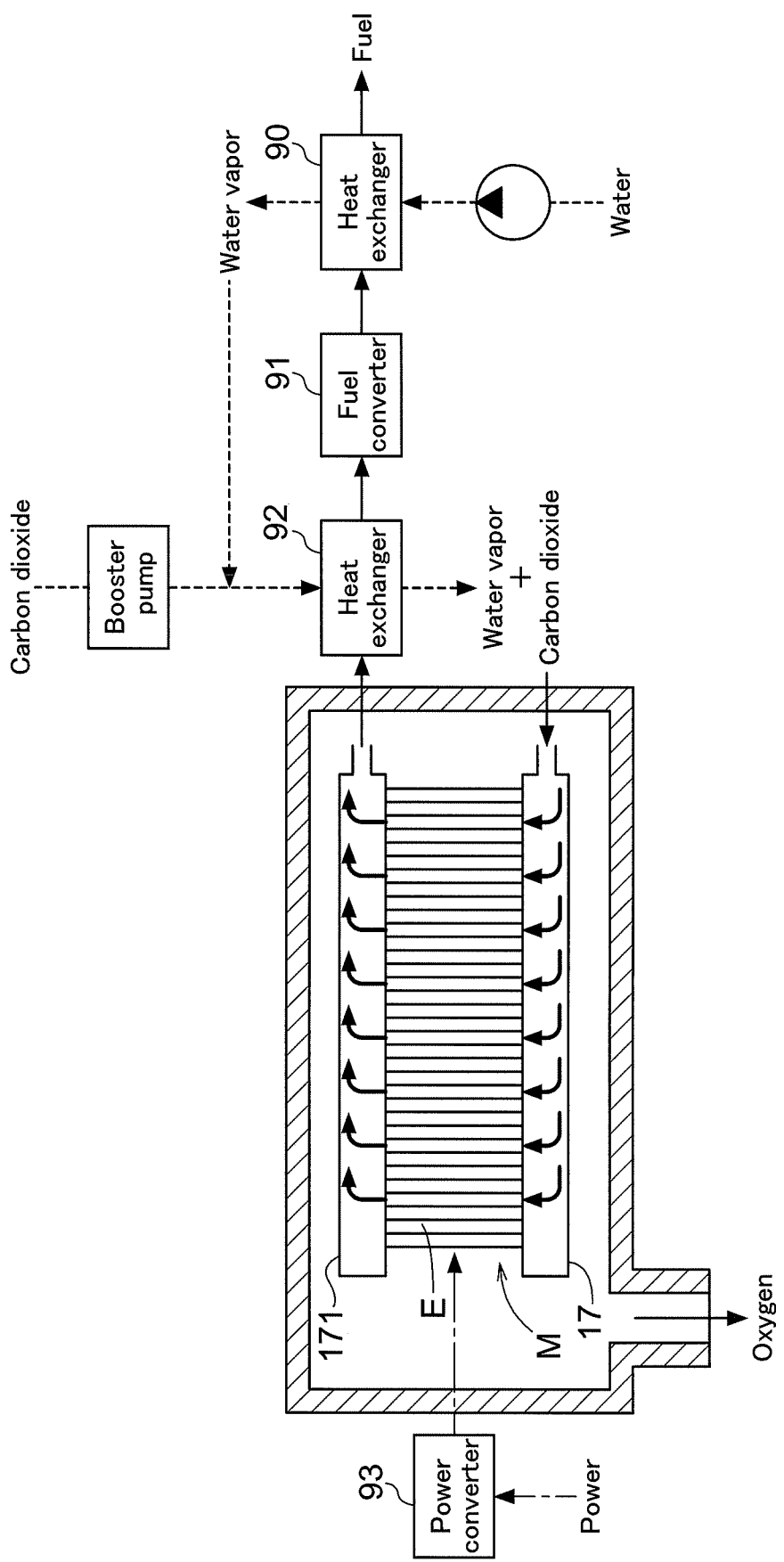
FIG. 8 is a schematic diagram showing configurations of another electrochemical device and another energy system.

In an energy system shown in FIG. 8, the electrochemical module M includes a plurality of electrochemical elements E, a gas manifold 17, and a gas manifold 171. The electrochemical elements E are arranged side-by-side and electrically connected to each other. One end portion (lower end portion) of each of the electrochemical elements E is fixed to the gas manifold 17, and the other end portion (upper end portion) thereof is fixed to the gas manifold 171. Water vapor and carbon dioxide are supplied to the gas manifold 17, which is located on the one end (lower end) side of each of the electrochemical elements E. Hydrogen, carbon monoxide, and the like generated through the above-described reactions in the electrochemical elements E of the electrochemical element E are collected by the manifold 171 that is in communication with the other end portion (upper end portion) of each of the electrochemical elements E.

By employing the configuration in which the heat exchanger 90 shown in FIG. 8 is operated as a waste heat utilization system that performs heat exchange between the water and the reaction heat produced by the reaction in the fuel converter 91 to vaporize the water, and the heat exchanger 92 shown in FIG. 8 is operated as a waste heat utilization system that performs heat exchange between water vapor and carbon dioxide, and waste heat produced by the electrochemical elements E to preheat the water vapor and the carbon dioxide, the energy efficiency can be improved.

Moreover, a power converter 93 supplies power to the electrochemical elements E. Accordingly, as mentioned above, the electrochemical elements E function as electrolytic cells.

Therefore, with the above-mentioned configuration, an electrochemical elements E and the like that can improve the efficiency of converting electric energy into chemical energy such as fuel can be provided.

(2) In the above-mentioned embodiments, a composite material such as NiO-GDC, Ni-GDC, NiO—YSZ, Ni—YSZ, CuO—$CeO_2$, or Cu—$CeO_2$ is used as the material of the electrode layer 2, and a complex oxide such as LSCF or LSM is used as the material of the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material of the electrode layer 2, and a composite material such as NiO-GDC, Ni-GDC, NiO—YSZ, Ni—YSZ, CuO—$CeO_2$, or Cu—$CeO_2$ is used as the material of the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

(3) Although the electrochemical element E is mainly used in a solid oxide fuel cell having a flat-plate shape or a cylindrical flat-plate shape in the above-mentioned embodiments, the electrochemical element E can also be applied to electrochemical elements for a solid oxide fuel cell having a cylindrical shape.

(4) In the above-mentioned embodiments, the electrochemical device Y includes the electrochemical module M including a plurality of electrochemical elements E. However, the electrochemical device Y of the above-mentioned embodiments can also be applied to a configuration in which one electrochemical element E is provided.

(5) Although the electrochemical element E has a configuration in which the U-shaped member 7 is attached to the back face of the metal support 1, and two members, namely the metal support 1 and the U-shaped member 7, form a tubular support, a configuration may also be employed in which a tubular support is constituted by a metal support 1 and a U-shaped member 7 formed in one piece using a single member, or in which a tubular support is constituted by three or more members.

Moreover, a configuration may also be employed in which the U-shaped member 7 is omitted and the metal support 1 supports the electrode layer 2 and the like.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

DESCRIPTION OF REFERENCE SIGNS

1 Metal support
1*a* Front face
1*b* Back face
1*c* Penetration space
1*d* Front-side opening
1*e* Back-side opening
1*f* Metal oxide layer
1*g* Hole region
2 Electrode layer
4 Electrolyte layer
6 Counter electrode layer
T Thickness
D Inside diameter, diameter, hole diameter
P Pitch, interval
S Area (front-side opening)
10 First metal plate
10*a* First front face
10*b* First back face
10*c* First penetration space
10*d* First front-side opening 10e First back-side opening
10g First hole region
T1 Thickness
D1 Inside diameter, diameter, hole diameter
P1 Pitch, interval
S1 Area (front-side opening)
20 Second metal plate
20a Second front face
20b Second back face
20c Second penetration space
20d Second front-side opening
20e Second back-side opening
T2 Thickness
D2 Inside diameter, diameter, hole diameter
P2 Pitch, interval
E Electrochemical element
M Electrochemical module
Y Electrochemical device
Z Energy system

The invention claimed is:

1. A solid oxide fuel cell comprising:
an electrochemical element including a metal support, an electrode layer, an electrolyte layer, and a counter electrode layer,
wherein the metal support has a plate shape,
the electrode layer, the electrolyte layer, and the counter electrode layer are provided on/over a front face of the metal support,
the metal support is provided with a plurality of penetration spaces that pass through the metal support from the front face to a back face,
each front-side opening that is an opening of the penetration spaces formed in the front face has an area of $3.0 \times 10^{-4}$ mm$^2$ or more and $3.0 \times 10^{-3}$ mm$^2$ or less,
intervals between the front-side openings are 0.05 mm or more and 0.3 mm or less, and
a power generation reaction is caused in the electrochemical element.

2. A solid oxide electrolytic cell comprising:
an electrochemical element including a metal support, an electrode layer, an electrolyte layer, and a counter electrode layer,
wherein the metal support has a plate shape,
the electrode layer, the electrolyte layer, and the counter electrode layer are provided on/over a front face of the metal support,
the metal support is provided with a plurality of penetration spaces that pass through the metal support from the front face to a back face,
each front-side opening that is an opening of the penetration spaces formed in the front face has an area of $3.0 \times 10^{-4}$ mm$^2$ or more and $3.0 \times 10^{-3}$ mm$^2$ or less,
intervals between the front-side openings are 0.05 mm or more and 0.3 mm or less, and
an electrolytic reaction is caused in the electrochemical element.

3. The solid oxide fuel cell according to claim 1, wherein each of the front-side openings has a circular shape or a substantially circular shape having a diameter of 20 μm or more and 60 μm or less.

4. The solid oxide fuel cell according to claim 1, wherein each of back-side openings that are openings of the penetration spaces formed in the back face has an area or a diameter larger than those of the front-side openings.

5. The solid oxide fuel cell according to claim 1, wherein the metal support has a thickness of 0.1 mm or more and 1.0 mm or less.

6. The solid oxide fuel cell according to claim 1, wherein the metal support is formed by stacking a plurality of metal plates.

7. The solid oxide fuel cell according to claim 1, wherein the metal support is formed by stacking a plurality of metal plates having the same thickness or substantially the same thickness.

8. The solid oxide fuel cell according to claim 1, wherein the metal support is formed by stacking a plurality of metal plates including a first metal plate that is a plate made of metal, and a second metal plate that is a plate made of metal and is thicker than the first metal plate, the first metal plate being arranged closer to the front face than the second metal plate is.

9. The solid oxide fuel cell according to claim 1, wherein the metal support is made of a Fe—Cr based alloy.

10. The solid oxide fuel cell according to claim 1, wherein at least a portion of the front face is covered by a metal oxide film.

11. The solid oxide electrolytic cell according to claim 2, wherein each of the front-side openings has a circular shape or a substantially circular shape having a diameter of 20 μm or more and 60 μm or less.

12. The solid oxide electrolytic cell according to claim 2, wherein each of back-side openings that are openings of the penetration spaces formed in the back face has an area or a diameter larger than those of the front-side openings.

13. The solid oxide electrolytic cell according to claim 2, wherein the metal support has a thickness of 0.1 mm or more and 1.0 mm or less.

14. The solid oxide electrolytic cell according to claim 2, wherein the metal support is formed by stacking a plurality of metal plates.

15. The solid oxide electrolytic cell according to claim 2, wherein the metal support is formed by stacking a plurality of metal plates having the same thickness or substantially the same thickness.

16. The solid oxide electrolytic cell according to claim 2, wherein the metal support is formed by stacking a plurality of metal plates including a first metal plate that is a plate made of metal, and a second metal plate that is a plate made of metal and is thicker than the first metal plate, the first metal plate being arranged closer to the front face than the second metal plate is.

17. The solid oxide electrolytic cell according to claim 2, wherein the metal support is made of a Fe—Cr based alloy.

18. The solid oxide electrolytic cell according to claim 2, wherein at least a portion of the front face is covered by a metal oxide film.

* * * * *